United States Patent
Abercrombie, III et al.

(10) Patent No.: US 8,751,509 B1
(45) Date of Patent: *Jun. 10, 2014

(54) SOCIAL NETWORK FOR TRAVELERS WITH LAYOVERS

(71) Applicants: Charles Clinton Abercrombie, III, Clifton, VA (US); Allen D. Cassano, Broomnfield, CO (US)

(72) Inventors: Charles Clinton Abercrombie, III, Clifton, VA (US); Allen D. Cassano, Broomnfield, CO (US)

(73) Assignee: Intercept, LLC, Clifton, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,649

(22) Filed: Nov. 26, 2012

Related U.S. Application Data

(63) Continuation of application No. 11/857,977, filed on Sep. 19, 2007, now Pat. No. 8,341,162.

(51) Int. Cl.
*G06F 17/30* (2006.01)

(52) U.S. Cl.
USPC ............ 707/748; 707/613; 707/741; 707/758

(58) Field of Classification Search
None
See application file for complete search history.

(56) References Cited

U.S. PATENT DOCUMENTS

| | | | |
|---|---|---|---|
| 6,711,617 B1 * | 3/2004 | Bantz et al. | 709/227 |
| 7,069,308 B2 | 6/2006 | Abrams | |
| 7,117,254 B2 | 10/2006 | Lunt et al. | |
| 7,188,153 B2 | 3/2007 | Lunt et al. | |
| 2002/0091556 A1 | 7/2002 | Fiala et al. | |
| 2005/0144483 A1 | 6/2005 | Robertson et al. | |
| 2006/0004590 A1 * | 1/2006 | Khoo | 705/1 |
| 2006/0041543 A1 | 2/2006 | Achlioptas | |
| 2006/0042483 A1 | 3/2006 | Work et al. | |
| 2006/0111959 A1 | 5/2006 | Tarr et al. | |
| 2006/0150175 A1 * | 7/2006 | Etelapera | 717/168 |
| 2006/0156242 A1 * | 7/2006 | Bedingfield | 715/738 |
| 2007/0078729 A1 * | 4/2007 | Brown | 705/26 |
| 2007/0273558 A1 | 11/2007 | Smith et al. | |
| 2008/0016442 A1 * | 1/2008 | Khoo | 715/700 |
| 2008/0021728 A1 * | 1/2008 | Khoo | 705/1 |
| 2008/0082421 A1 | 4/2008 | Onyon et al. | |

(Continued)

FOREIGN PATENT DOCUMENTS

| | | |
|---|---|---|
| KR | 10-2000-0030645 A | 6/2000 |
| KR | 10-2004-0034060 A | 4/2004 |

OTHER PUBLICATIONS

"http://www.tuctuk.com/register.php" Tuc Tuk Register, Internet Web Site, printed Sep. 23, 2008.

*Primary Examiner* — Mohammad S Rostami
(74) *Attorney, Agent, or Firm* — Larson & Larson, P.A.; Frank Liebenow; Justin P. Miller

(57) ABSTRACT

A computer system that provides a social network for traveling people includes software that maintains a list of members and buddies of the members. Each member has at least one association to a unique person identifier. The software downloads schedule(s) from pre-determined schedule system(s). Each schedule has records with a person identifier, at least one date/time, and a location. The software searches the schedule(s) and extracts a subset of records in which the person identifier corresponds with the unique person identifier of any member and the software creates layover entries from the subset. The software searches the layover entries for overlapping layovers, determined by a first member having a layover that overlaps with a layover of a buddy member (e.g. having the same or similar location). For each overlapping layover, the software notifies either the member and/or the buddy who have the overlapping layover.

20 Claims, 20 Drawing Sheets

(56) References Cited

U.S. PATENT DOCUMENTS

| | | |
|---|---|---|
| 2008/0098313 A1 | 4/2008 | Pollack |
| 2008/0132252 A1 | 6/2008 | Altman et al. |
| 2008/0140786 A1 | 6/2008 | Tran |
| 2008/0195664 A1 | 8/2008 | Maharajh et al. |
| 2008/0228719 A1 | 9/2008 | Abhyanker et al. |
| 2008/0235331 A1 | 9/2008 | Melamed et al. |
| 2008/0243564 A1* | 10/2008 | Busch et al. ............ 705/6 |
| 2009/0019004 A1 | 1/2009 | Abhyanker |

* cited by examiner

| USER INFORMATION |
| --- |
| USER ID |
| NAME |
| HOME PHONE |
| WORK PHONE |
| CELL PHONE |
| EMAIL ADDRESS |
| HOME ADDRESS |
| BUDDY LIST |
| CONTACT METHODS |
| ASSOCIATIONS LIST |

SOCIAL NETWORK FOR TRAVELERS WITH LAYOVERS

CROSS-REFERENCE TO RELATED APPLICATION

This application is a continuation of U.S. Pat. No. 8,341,162 issued Dec. 25, 2012, the disclosure of which is hereby incorporated by reference.

FIELD

This invention relates to the field of data processing and more particularly to a system for managing layovers for travelers.

BACKGROUND

Social networks are well known. Early in the history of the Internet, social networks primarily provided a dating service whereby a user would register and create a profile containing a posting. In this, they would describe themselves, their likes, dislikes, hobbies, work, etc. Once created, the posting is advertised to others looking for a mate.

Later, such networks evolved to concentrate on needs other than dating. Web sites the likes of Myspace.com and Facebook.com appeal to the social needs of people, providing a canvas on which members write about themselves, post pictures and the like.

For the more business focus, web sites such as linkedin.com emerged to provide online business networking. Such a network provides secure access and a system that mimics business relationship networking. For example, once you are invited to become a friend (or buddy) to another member and accept, you have the ability to keep in contact with that member, plus, if friends of your friend allow, you will be able to network with them.

Several patents and patent publications describe social networks or specialized features of certain social networks. U.S. Pat. No. 7,188,153 to Lunt, et al., describes a social network that includes a feature to upload files such as images (picture) that can be viewed by your contacts.

U.S. Pat. No. 7,069,308 to Abrams describes a method of more effectively connecting people in a social network.

U.S. Pat. No. 7,117,254 to Lunt, et al., describes a social network that includes an invitation feature for members to invite new members to join their private network and for members to write positive comments about other members.

U.S. Pat. Application No. 2006/0042483 to Work, et al., describes a method for evaluating reputations of users in a social network.

U.S. Pat. Application No. 2006/0041543 to Achlioptas describes a method for navigating and searching in a social network.

What is needed is a system that will provide the usual social networking tools with the addition of providing tools for finding out when a user is on a layover in the same location as another user.

SUMMARY

In one embodiment, a computer system providing a social network for traveling people is disclosed including a server computer and software. The software maintains a list of members and, for each member, the software maintains a list of buddies of the each member. The buddies are also in the list of members. Each member has at least one association to a unique person identifier (e.g. an email account, user name, user identifier, etc.). The software downloads at least one schedule from one or more pre-determined schedule systems. Each schedule has a plurality of records, each having a person identifier, at least one date/time, and a location. The person identifier uniquely identifies each person associated with each record. The software searches the schedule(s) and extracts a subset of records in which the person identifier corresponds with the unique person identifier of any member of the list of members and the software creates layover entries from the subset of the records, each of the layover entries comprise the member, a layover location and a layover date/time. The software searches the layover entries for overlapping layovers, determined by a first member of the list of members having a layover that overlaps with a layover of a buddy member (e.g. having the same or similar location). For each overlapping layover, the software notifies either the member and/or the buddy who have the overlapping layover.

In another embodiment, a method of notifying members of a social network of upcoming overlapping layovers is disclosed including (a) maintaining a list of members and, for each member, maintaining a list of buddies of the each member. Each member has at least one association to at least one unique identifier. Next, (b) downloading at least one schedule from at least one pre-determined schedule system. Each of the at least one schedule has been created by one of the at least one schedule system. Each record of the at least one schedule has a person identifier, a date, and a location, wherein the person identifiers uniquely identify one person being that often a person is known by a different identifier on different systems (e.g. user123, user@domain.com, etc.). (c) For each record, if the person identifier matches the unique identifier of a member, a layover data record is saved that includes the member, the date, and the location. (d) For each of the layover data records, the layover data records are searched for a buddy having an overlapping layover data record, and if the searching finds an overlapping layover data record, the member(s) of the overlapping layover is/are automatically notified.

In another embodiment, a signal tangibly embodied in a non-transitory storage medium for notifying of upcoming overlapping layovers is disclosed includes: (a) computer readable instructions that maintain a list of members and, for each member, maintain a list of buddies of the each member. Each member has at least one association to at least one unique identifier (e.g. a unique email address or user name). (b) Computer readable instructions download at least one schedule. Each schedule was created on a pre-determined schedule system without direct input from the members and each schedule includes a plurality of records. Each record has a person identifier, at least one date, and at least one location. (c) Computer readable instructions extract layover data from the records in which the person identifier in the record corresponds with the unique identifier of any member of the list of members. The layover data comprises the any member (e.g. an identification of the member), a layover location, and a layover time period. The person identifier assists in uniquely identifying a correspondence between the records in the schedules and the any member of the list of members being that people tend to have different names or login credentials on different systems. (d) Computer readable instructions search the layover data for a set of overlapping layovers in which a layover of the member and a layover of a buddy of the member have the same location and (e) for each overlapping layover in the set of overlapping layovers, computer readable instructions notify the member and/or the buddy of the overlapping layover. (f) Periodically steps (b) through (e) are repeated.

BRIEF DESCRIPTION OF THE DRAWINGS

The invention can be best understood by those having ordinary skill in the art by reference to the following detailed description when considered in conjunction with the accompanying drawings in which:

FIG. 8 illustrates a typical member data record of all embodiments.

FIG. 16 illustrates a typical user interface for creating a member account of all embodiments.

DETAILED DESCRIPTION

Figure 1:
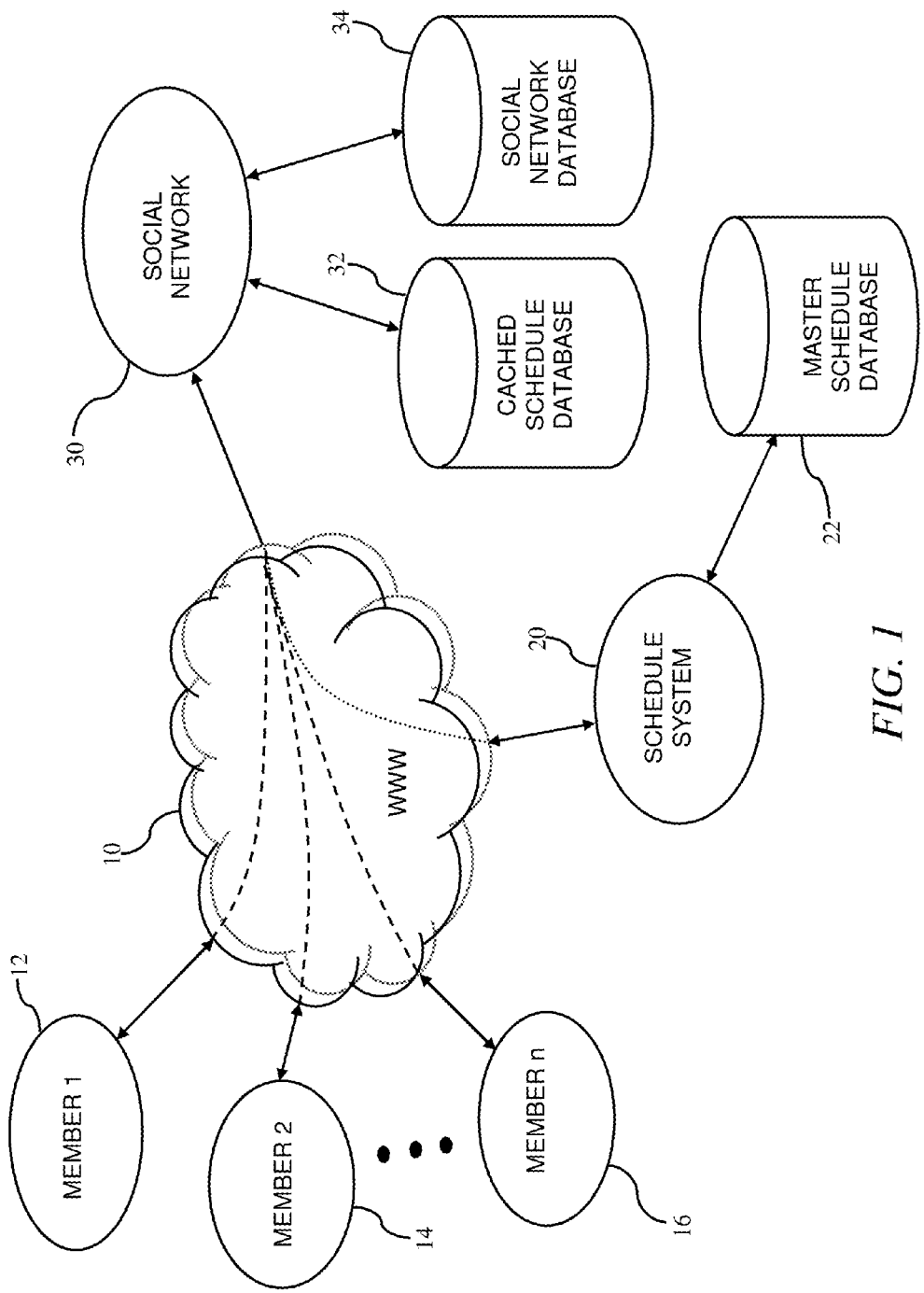
FIG. 1 illustrates a schematic view of a system of a first embodiment.

Reference will now be made in detail to the invention, examples of which are illustrated in the accompanying drawings. Throughout the following detailed description, the same reference numerals refer to the same elements in all figures.

The term location for the purpose of the present invention relates to a place that is convenient for two or more members of the social network to meet during a layover. For example, if one member has a layover in Oakland and another in San Francisco, location refers to the greater bay area since such would allow for both members to easily meet, perhaps using BART to travel to an agreed upon location in San Francisco. The term layover is used to describe a city/location in which the member is located for an amount of time. Pilots, flight attendants and truck drivers often have layovers in the course of their employment. For example, a pilot scheduled to fly from Tampa arriving in San Francisco at 5:00 PM and leaving the next morning has an overnight layover.

The system is not limited in any way to pilots, flight attendants and truck drivers. Any user of the social network is capable of having a layover in a certain geographic region. For example, two members of the social network working for different companies, in the course of their work, need to be in Taipei. The time they are in Taipei is considered a layover for the purpose of the disclosed system. Therefore, if the two member's layovers in Taipei overlap, the system will inform them of such overlap and they can arrange to meet socially.

Throughout this description, when two members have a corresponding overlap, a notification is sent to one or both of the members. There are many ways known in the industry to send such a notification including, but not limited to, mail (post), email, text message and page. The recipient has also many different ways to receive such notification on a plethora of devices including, but not limited to, mail boxes, personal computers, personal digital assistants (PDAs), cell phones, pagers and PDA-cell phones (e.g., Blackberry®).

Throughout this description, the term "member" refers to a registered user of the social network system of the disclosed system. The term "buddy" is another member of the social network system and is a person who is known to the member and the member has taken steps within the social network to indicate such relationship. The term "layover" refers to a place where the member and/or buddy are located for a period of time (e.g., one or both have a layover in San Francisco). It should be noted that if the member or buddy are at home, in some situations, this is a layover. Throughout this description, the term "overlapping layover" refers to two or more members having a layover in the same location. For example, overlapping layovers exist when the member is at home in San Francisco (or visiting San Francisco) and their buddy (from another location) is in San Francisco for the evening.

The disclosed system has many uses. For example, the disclosed system provides information to travelers to optimize their free time when on layovers, improving employee morale. Airlines use of the disclosed system provides such improved employee morale and, in some circumstances, is used to determine when compatible flight crews/flight attendants are on common layovers. In this, the airline is able to provide incentives for sharing a hotel room to the flight crews/flight attendants with overlapping layovers, thereby reducing hotel costs to the airline while further improving morale.

Referring to FIG. 1, a schematic view of a system of a first embodiment will be described. In this embodiment, a schedule system 20 is external to the social network 30. A schedule system 20 is, for example, an airline personnel schedule system that assigns pilots and flight attendants to specific flight schedules. Another example of a schedule system 20 is a trucking company schedule system that assigns truckers to specific routes. In another embodiment, a schedule system 20 is a reservation system such as an airline reservation system or general reservation system such as Expedia and Orbitz. In alternate embodiments, the schedule system 20 is any system that includes a scheduling capability. In general, the user (member and/or buddy) do not directly enter schedule data into the schedule system 20, rather are scheduled by the schedule system and/or choose certain already available options on the schedule system which will determine when the user (member or buddy) will travel (e.g., the user selects a flight that has a pre-determined schedule). The schedule system 20 has access to a master schedule database 22 where the scheduling data is stored. In this embodiment, part or all of the schedule data from the master schedule database 22 is uploaded/downloaded to the social network 30 through a network such as the Internet (WWW) 10. The social network 30 extracts the data needed to perform layover matching and stores at least that data in a cached schedule database 32. In some embodiment, the uploaded schedule data is processed as it is received and not stored in the cached schedule database 32. As with many social network systems, the social network 30 has its own social network database 34 for storing security information, member information, etc. In this embodiment, several members 12/14/16 are shown connected to the social network 30 through the network 10. As an example, the members 12/14/16 are pilots, flight attendants or truckers.

Figure 1A:
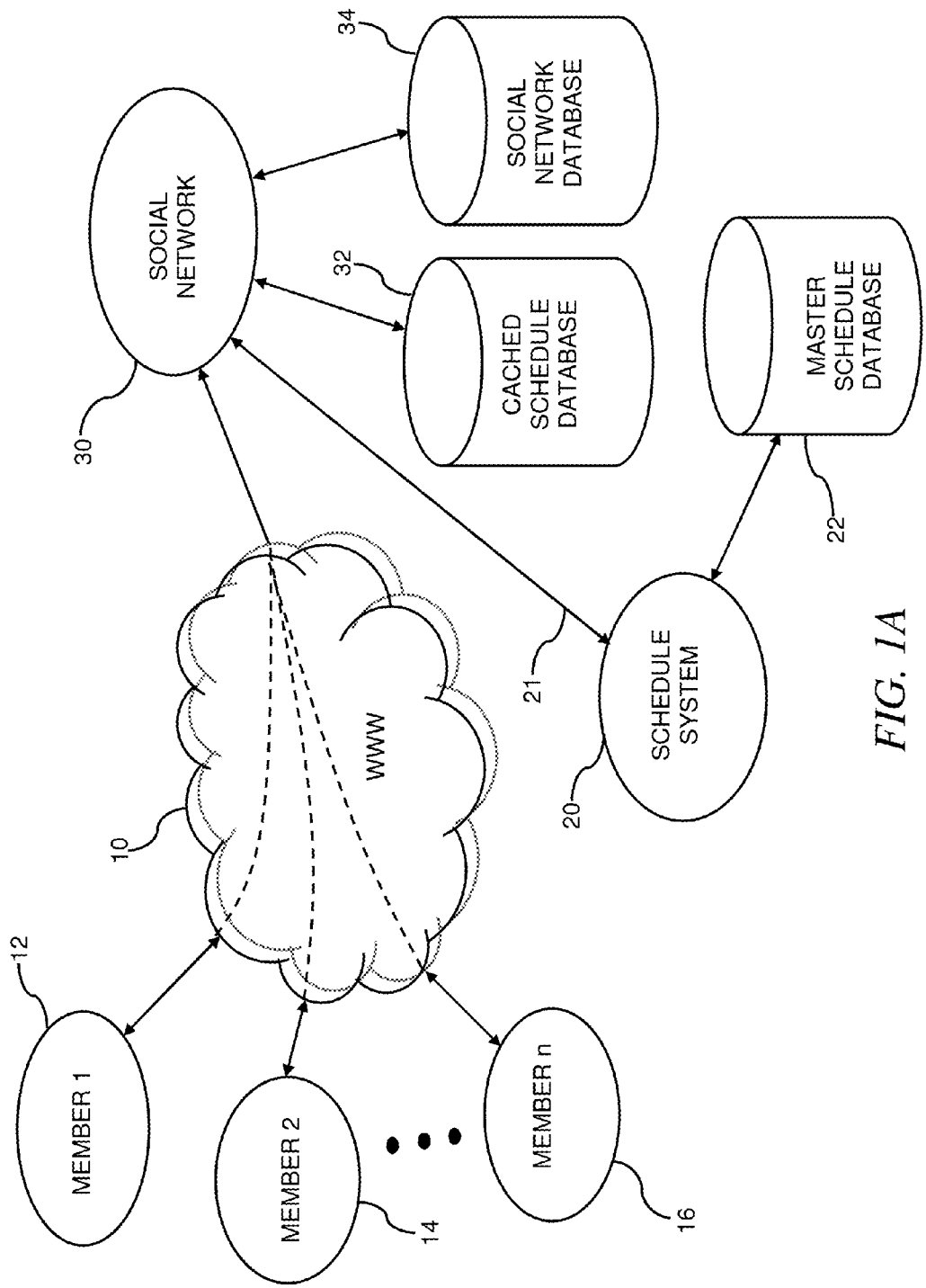
FIG. 1A illustrates a schematic view of a system of a second embodiment.

Referring to FIG. 1A, a schematic view of a system of a second embodiment will be described. In this embodiment, as with that of FIG. 1, a schedule system 20 is external to the social network 30. A schedule system 20 is, for example, an airline personnel schedule system that assigns pilots and flight attendants to specific flight schedules. Another example of a schedule system 20 is a trucking company schedule system that assigns truckers to specific routes. In alternate embodiments, the schedule system 20 is any system that includes a scheduling capability as described above. The schedule system 20 has access to a master schedule database 22 where the scheduling data is stored. In this embodiment, part or all of the schedule data from the master schedule database 22 is uploaded to the social network 30 through a direct link 21 such as a digital transmission line (e.g., T1, T3), magnetic tape, disk, etc. This embodiment adds additional security to the sensitive schedule data that is being transferred. The social network 30 extracts the data needed to perform layover matching and stores at least that data in a cached schedule database 32. In some embodiment, the uploaded schedule data is processed as it is received and not stored in the cached schedule database 32. As with many social network systems, the social network 30 has its own social network database 34 for storing security information, member information, etc. In this embodiment, several members 12/14/16 are connected to the social network 30 through the network 10. As an example, the members are pilots, flight attendants or truckers. In practice, members are registered; in that, each member 12/14/16 provides personal information to the social network 30 such as name, phone number and a username/password. The user name is used to authenticate the member 12/14/16 each time the member 12/14/16 accesses the social network 30. Any number of members 12/14/16 are possible.

For all embodiments, it is anticipated that, for some members 12/14/16, the member's name lacks sufficient uniqueness as to properly identify that member 12/14/16 across multiple systems (e.g., there are multiple flight attendants with the same first and last names). To overcome ambiguity, it is anticipated that the social network 30 provides one or more user registrations, in which, each member 12/14/16 provides further identification for each schedule system 20 of which they are a part. For example, Tina Jones is a member of the social network 30 and is known as Tina34. Tina is a pilot for United Airlines and her identification number is 123456. Tina Jones also uses Expedia and her identification for Expedia is her email address, tina@yahoo.com. The social network 30 provides tool for each member 12/14/16 to create associations between the member's account on the social network 30 and schedule systems 20, and these associations are stored, for example, in the social network database 34. These associations identify the schedule system 20 (e.g. United Airlines) and the member 12/14/16 within that schedule system 20 (e.g. badge number 123456) so that, as the schedule data is processed by the social network system 30, finding schedule records for a person with badge number 123456 will correlate to social network member Tina34, etc.

Likewise, for all embodiments, it is anticipated that as periodic schedule downloads occur, some or all of the schedule data is repetitive. For example, if Tina Jones is scheduled to fly from Detroit to Amsterdam at 3:30 PM on August 21, arriving at 7:00 AM on August 22, then each day before August 21, this information is present in the data that is transferred from the schedule system 20 to the social network system 30. If Tina Jones is a buddy to Mike Smith, and Mike Smith will also have a layover in Amsterdam on August 22, then the first time that this schedule data is downloaded from the schedule system 20 to the social network 30, Tina and/or Mike are notified of the overlap. Since it is anticipated that this same schedule datum is to be downloaded multiple times, it is desired to suppress future notifications so that Tina and/or Mike, for example, do not receive notification every time the schedule data is transferred. To this, mechanisms are optionally present to retain knowledge of prior notifications or prior downloads. In such, if the same notification as a prior notification is detected or if the same download record as a prior download record is detected, notification is suppressed.

Figure 2:
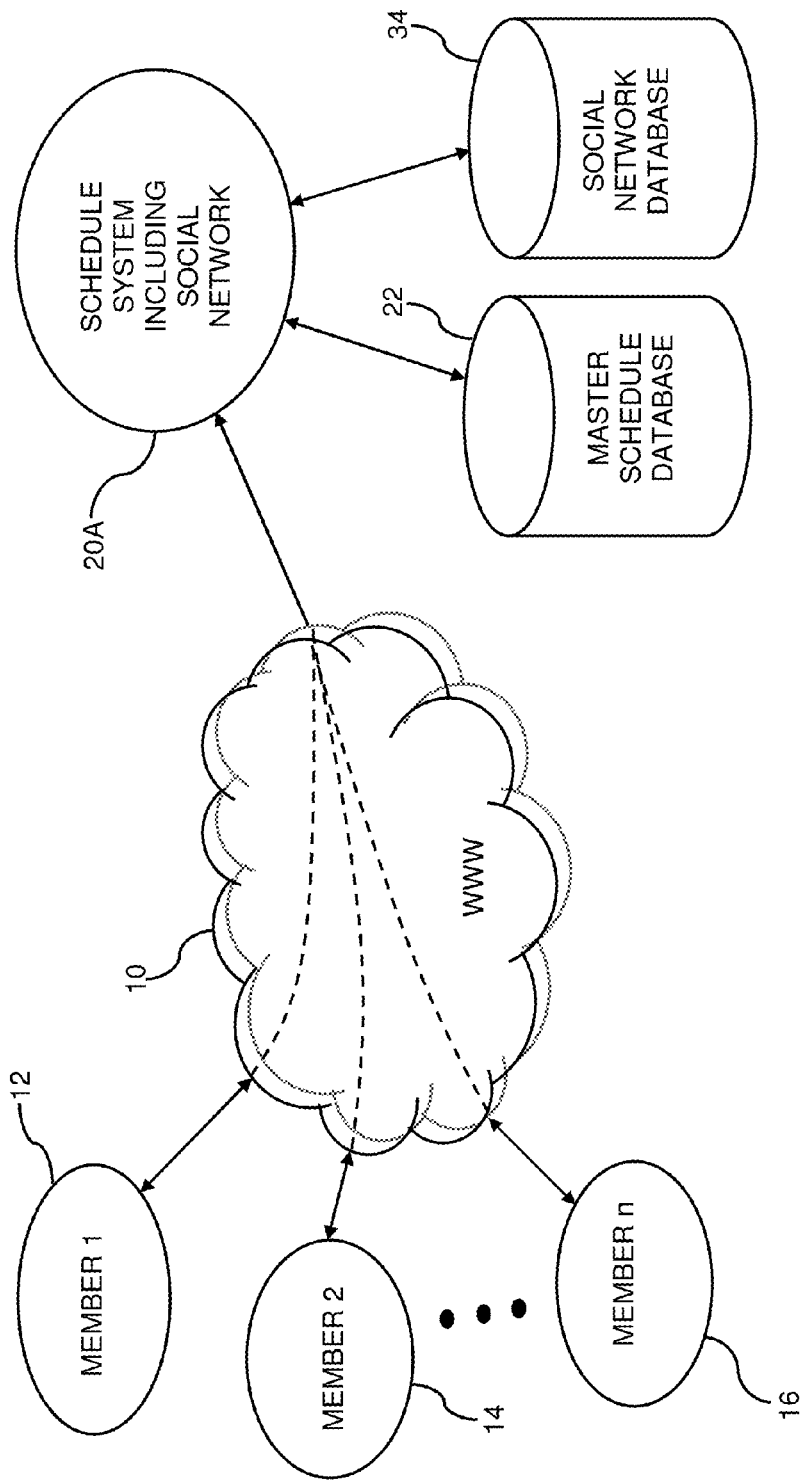
FIG. 2 illustrates a schematic view of a system of a third embodiment.

Referring to FIG. 2, a schematic view of a system of a third embodiment will be described. In this embodiment, the schedule system 20A is part and the same as the social network. In such, the schedule system 20A provides the features of a social network, at least those that provide notification of member layover overlap. For simplicity, the following examples will use an airline personnel schedule system that assigns pilots and flight attendants to specific flight schedules, although it is anticipated that any system with scheduling capability is a possible user of the present invention. The schedule system 20A has access to a master schedule database 22 where the scheduling data is stored. The social network 20A extracts the data needed to perform layover matching and notifies the members 12/14/16 as will be described. As with many social network systems, the social network 20A has its own social network database 34 for storing security information, member information, etc. In this embodiment, several members 12/14/16 are connected to the social network 20A through the network 10. As an example, the members are pilots, flight attendants or truckers.

Figure 3:
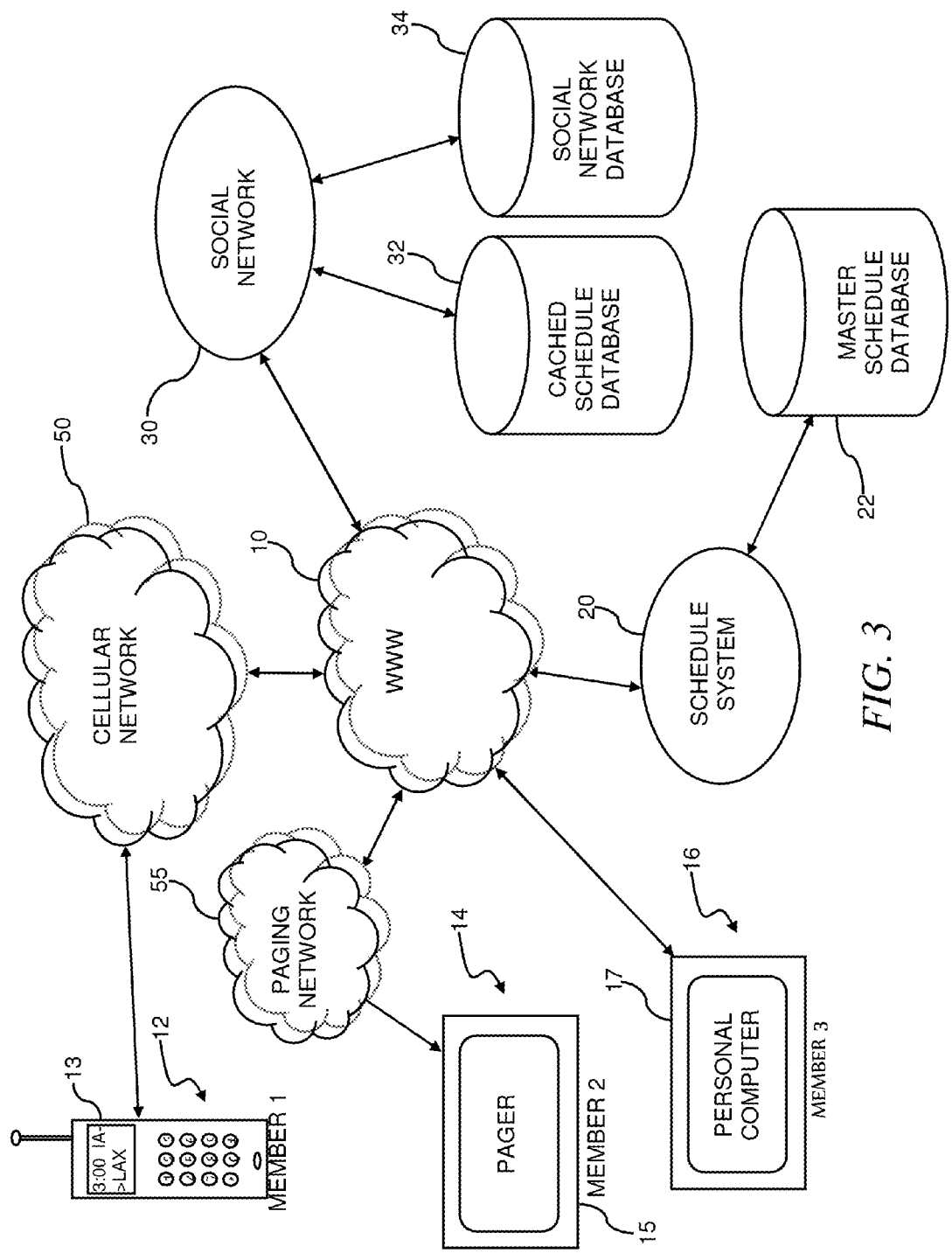
FIG. 3 illustrates a second schematic view of a system of the first embodiment.

Referring to FIG. 3, a second schematic view of a system of the first embodiment will be described. In this, a schedule system 20 is external to the social network 30. A schedule system 20 is, for example, an airline personnel schedule system that assigns pilots and flight attendants to specific flight schedules. The schedule system 20 has access to a master schedule database 22 where the scheduling data is stored. In this embodiment, part or all of the schedule data from the master schedule database 22 is uploaded to the social network 30 through a network such as the Internet (WWW) 10. The social network 30 extracts the data needed to perform layover matching and stores at least that data in a cached schedule database 32. In some embodiment, the uploaded schedule data is processed as it is received and not stored in the cached schedule database 32. As overlapping layovers are detected for members and their buddies, the member and buddy are notified of the overlapping layover. As with many social network systems, the social network 30 has its own social network database 34 for storing security information, member information, etc. In this embodiment, several members 12/14/16 are directly or indirectly connected to the social network 30 through the network 10. The first user is connected through the cellular network 50 and notified either by a voice message or text message sent from the social network 30, through the Internet 10 and through the cellular network 50 to a cellular phone 13 used by the first member 12. The second user 14 is connected through the paging network 55 and notified by a alpha or numeric page message sent from the social network 30, through the Internet 10 and through the paging network 55 to a pager 15 used by the second member 14. The third user 16 is connected through the Internet 10 and notified by an email message sent from the social network 30 through the Internet 10 to a personal computer 17 used by the third member 16.

Figure 3A:
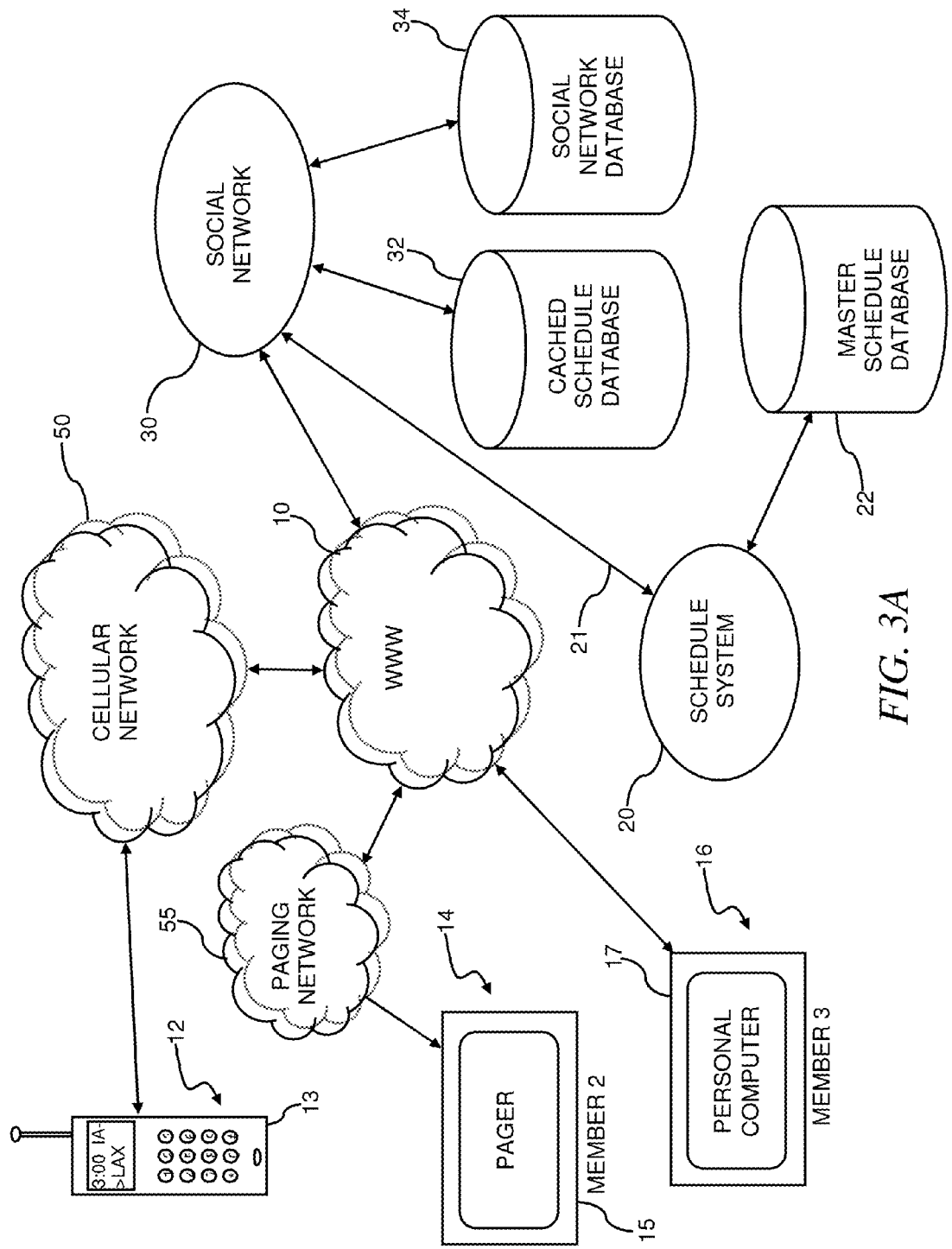
FIG. 3A illustrates a second schematic view of a system of the second embodiment.

Referring to FIG. 3A, a second schematic view of a system of the second embodiment will be described. In this, a schedule system 20 is external to the social network 30. A schedule system 20 is, for example, an airline personnel schedule system that assigns pilots and flight attendants to specific flight schedules. The schedule system 20 has access to a master schedule database 22 where the scheduling data is stored. In this embodiment, part or all of the schedule data from the master schedule database 22 is uploaded to the social network 30 through a private connection 21, for example, a private line such as T1-carrier, T3-carrier, etc. The social network 30 extracts the data needed to perform layover matching and stores at least that data in a cached schedule database 32. In some embodiment, the uploaded schedule data is processed as it is received and not stored in the cached schedule database 32. As overlapping layovers are detected for members and their buddies, the member and buddy are notified of the overlapping layover. As with many social network systems, the social network 30 has its own social network database 34 for storing security information, member information, etc. In this embodiment, several members 12/14/16 are directly or indirectly connected to the social network 30 through the network 10. The first user is connected through the cellular network 50 and notified either by a voice message or text message sent from the social network 30, through the Internet 10 and through the cellular network 50 to a cellular phone 13 used by the first member 12. The second user 14 is connected through the paging network 55 and notified by a alpha or numeric page message sent from the social network 30, through the Internet 10 and through the paging network 55 to a pager 15 used by the second member 14. The third user 16 is connected through the Internet 10 and notified by an email message sent from the social network 30 through the Internet 10 to a personal computer 17 used by the third member 16.

Figure 4:
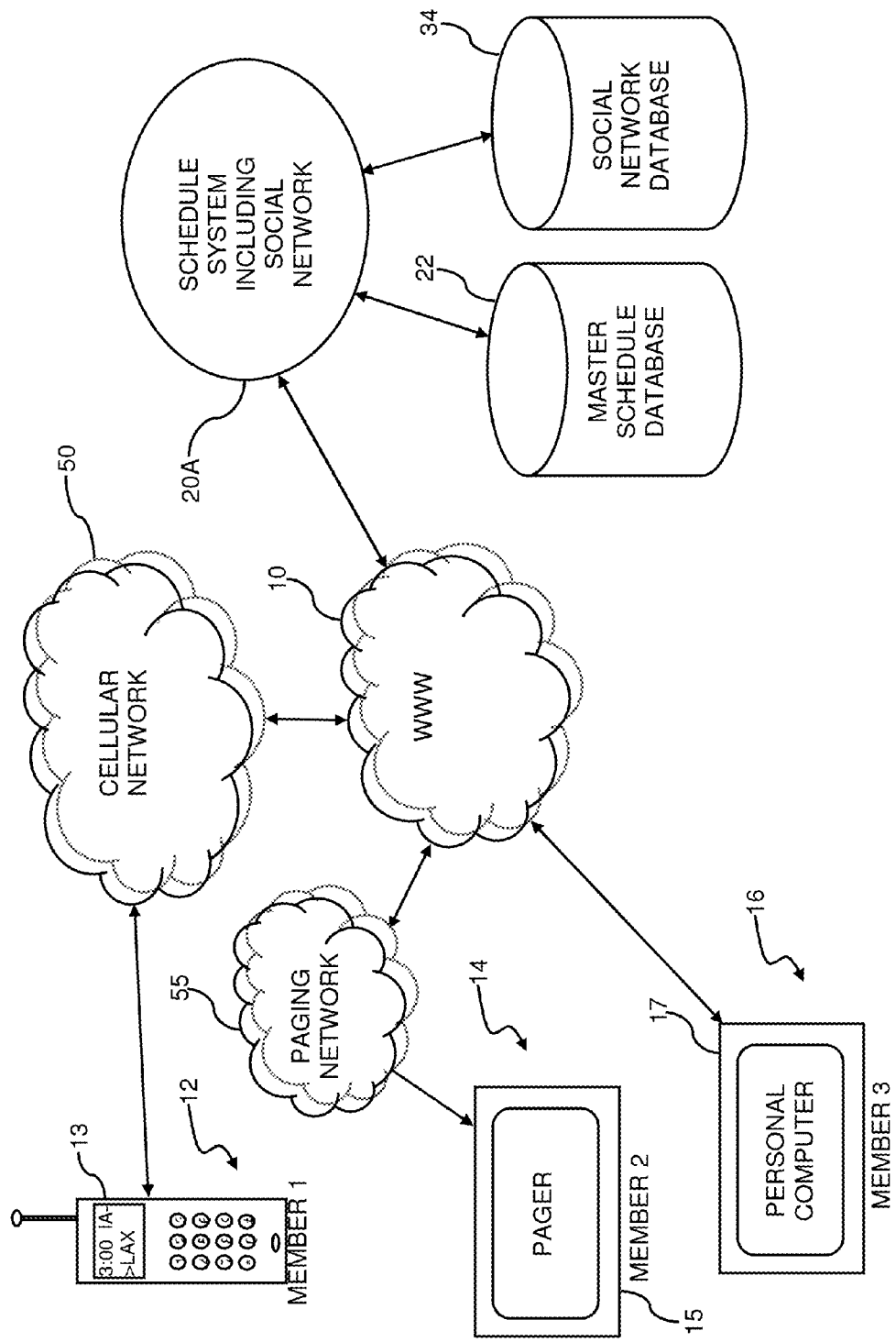
FIG. 4 illustrates a second schematic view of a system of the third embodiment.

Referring to FIG. 4, a second schematic view of a system of the third embodiment will be described. In this, a combined schedule system and social network 20A is described. For example, the social network part 30 is integrated into the same server system as the scheduling system 20. A schedule system 20 is, for example, an airline personnel schedule system that assigns pilots and flight attendants to specific flight schedules. The combined schedule system and social network 20A has access to a master schedule database 22 where the scheduling data is stored. The combined schedule system and social network 20A extracts the data from the master schedule 22 needed to perform layover matching and stores at least that data in a cached schedule database 32. In some embodiment, the schedule data 22 is processed and not stored in the cached schedule database 32. As overlapping layovers are detected for members and their buddies, the member and buddy are notified of the overlapping layover. As with many social network systems, the combined schedule system and social network 20A has its own social network database 34 for storing security information, member information, etc. In this embodiment, several members 12/14/16 are directly or indirectly connected to the combined schedule system and social network 20A through the network 10. The first user is connected through the cellular network 50 and notified either by a voice message or text message sent from the combined schedule system and social network 20A, through the internet 10 and through the cellular network 50 to a cellular phone 13 used by the first member 12. The second user 14 is connected through the paging network 55 and notified by a alpha or numeric page message sent from the combined schedule system and social network 20A, through the Internet 10 and through the paging network 55 to a pager 15 used by the second member 14. The third user 16 is connected through the Internet 10 and notified by an email message sent from the combined schedule system and social network 20A through the Internet 10 to a personal computer 17 used by the third member 16.

Figure 5:
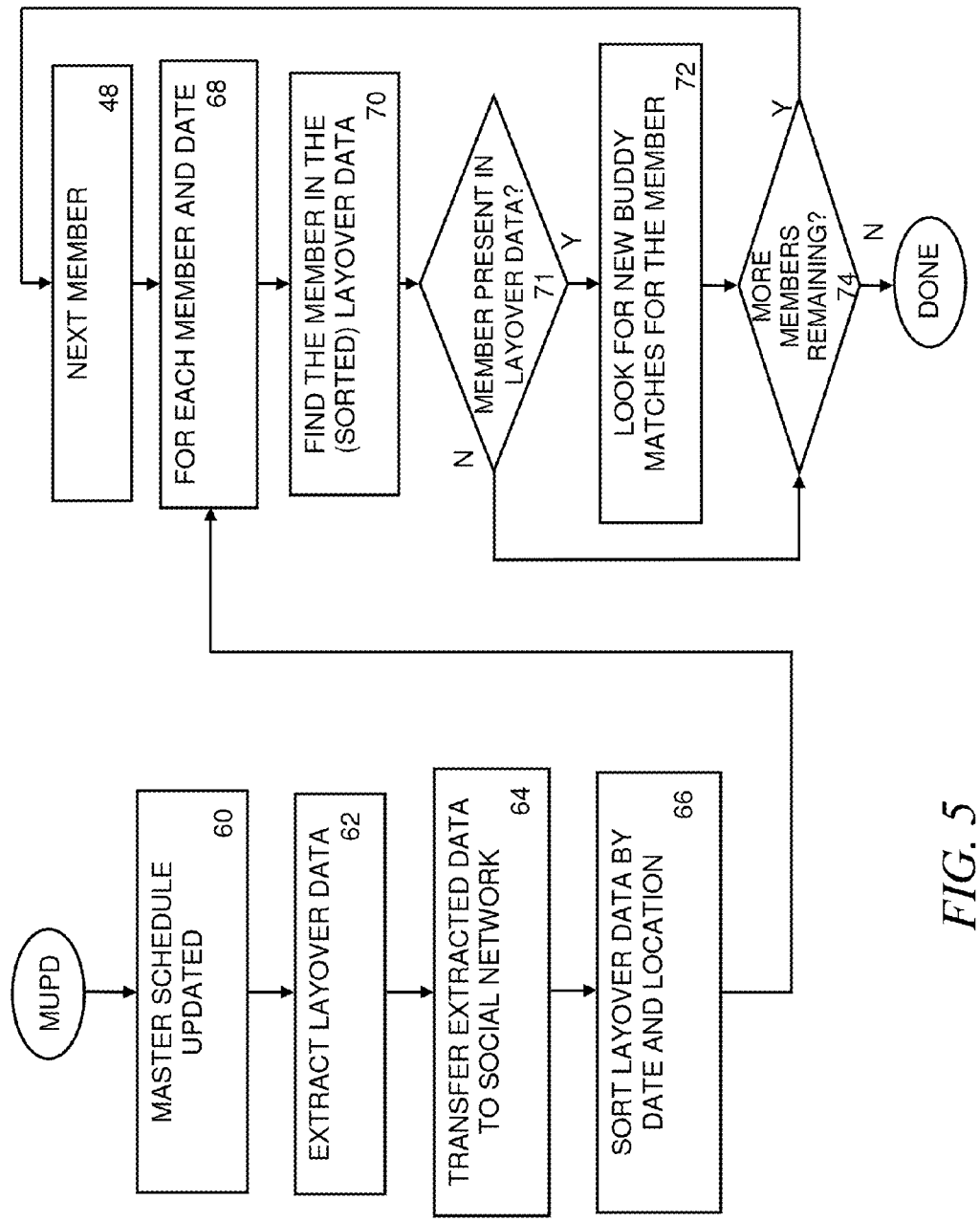
FIG. 5 illustrates a flow chart of the first and second embodiments.

Referring to FIG. 5, a flow chart of the first and second embodiments will be described. In some embodiments, the present invention is initiated by one or more changes (e.g., a batch change) to the dataset (master schedule). In other embodiments, the dataset (master schedule) is scanned periodically, for example, at 3:00 AM (described in FIG. 5A). In this embodiment, the master schedule is updated 60 and then the layover data is extracted 62. For example, the master schedule has details regarding the aircraft type, gate number, etc., that is not needed by the social network 30 and such data is optionally stripped out when the layover data is extracted 62.

In embodiments where the schedule system 20 is distinct from the social network 30, the extracted layover data is transferred 64 from the schedule system 20 to the social network 30 either over the Internet 10 or by direct connection 21. In some embodiments, the layover data is optionally sorted 66 to improve performance. Next, for each known member (from the social network database 34) and date 68, the layover data is searched to find that member/date pair 70. For each member and date pair found in the layover data 71, the layover data is searched for buddy matches for that member 72. This is repeated until there are no more active members 74 with the next member 48. There are many other ways known to those skilled in the art to match up such members and layovers and the present invention is not limited to any one method, including the method described.

Figure 5A:
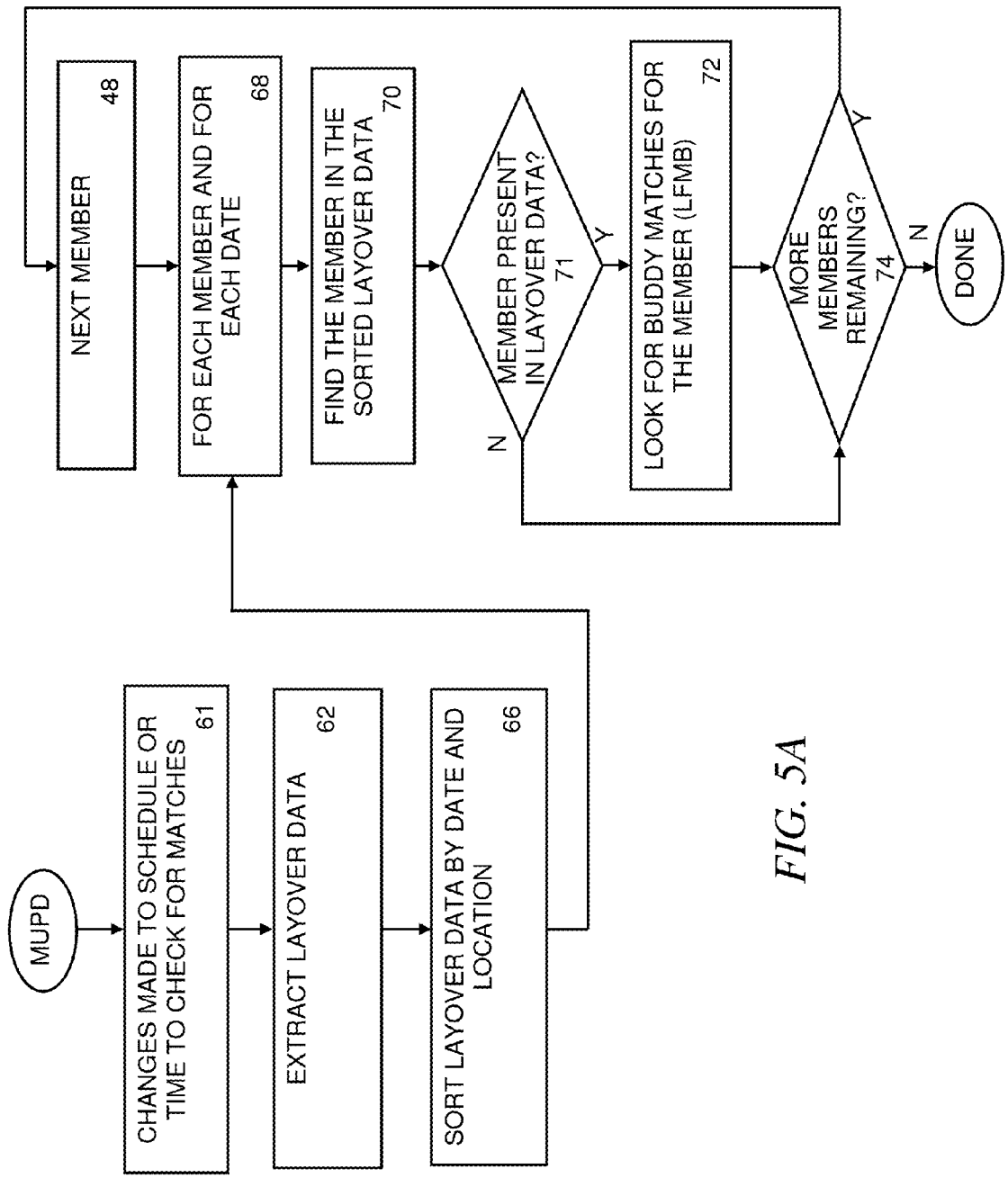
FIG. 5A illustrates a flow chart of the third embodiments.

Referring to FIG. 5A, a flow chart of the third embodiments will be described. In this embodiment, the methods of present invention are initiated by one or more changes 61 (e.g., a batch change) to the dataset (master schedule) or at a specific time 61 (e.g., 2:30 AM). The method starts by extracting layover data 62. In embodiments where the schedule system 20 is distinct from the social network 30, the extracted layover data is transferred from the schedule system 20 to the social network 30 either over the Internet 10 or by direct connection 21. In some embodiments, the layover data is sorted 66 to improve performance. Next, for each known member (from the social network database 34) and date 68, the layover data is searched to find that member/date pair 70. For each member and date pair found in the layover data 71, the layover data is searched for buddy matches for that member 72. This is repeated until there are no more active members 74 in the social network database 34 using the next member 48. There are many other ways known to those skilled in the art to match up such members and layovers and the present invention is not limited to any one method, including the method described.

Figure 6:
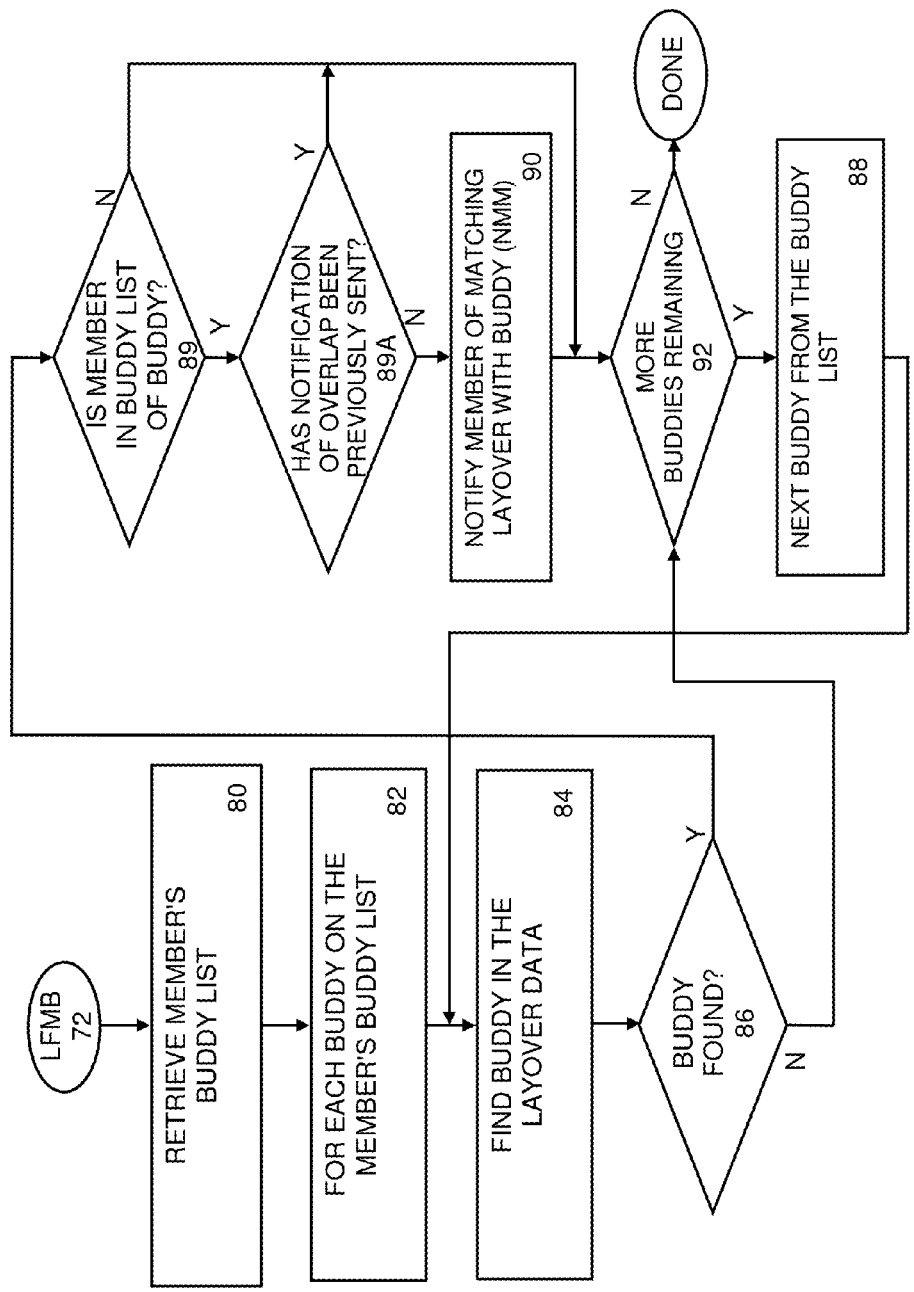
FIG. 6 illustrates a flow chart of all embodiments.

Referring to FIG. 6, a flow chart 72 of finding matches for member's buddies in all embodiments will be described. This part of the method operates when a member is found in the layover data (see FIGS. 5 and 5A). The member's buddy list is retrieved 80 (from the social network database 34). For each buddy on the list 82, the layover data is searched for the buddy 84. If the buddy is not found in the layover data 86 (having the same layover place and date as the member), if no more buddies exist 92, the flow is complete. Otherwise, the next buddy is retrieved from the list 88 and if there are more buddies on the list 92, the method continues. If the buddy is found in the layover data 86, a test is performed to determine if the member is a buddy (e.g., the member is on the buddy's buddy list) 89. This is one way to determine if the buddy allows the member to access the buddy's schedule data. There are other ways known to provide such permission, including but not limited to, the buddy allowing all members access, etc. If the member is allowed to access the buddy's schedule (e.g., on the buddy list of the buddy 89), optionally, a test 89A is performed to determine if this same notification has been already been made. There are many ways to determine if a notification has already been made, for example, recording each notification in a database/list and consulting that database/list to determine if a notification matches a previous notification record. If no prior notification was made 89A, the member is notified of a matching layover 90 (see FIG. 7) and if there are more buddies on the list 92, the method continues. If more buddies remain 92, the next buddy from the buddy list is accessed 88 and the method continues. If there are no more buddies on the list 92, the method is done. If there are no more buddies on the list 92, the method is done.

Figure 7:
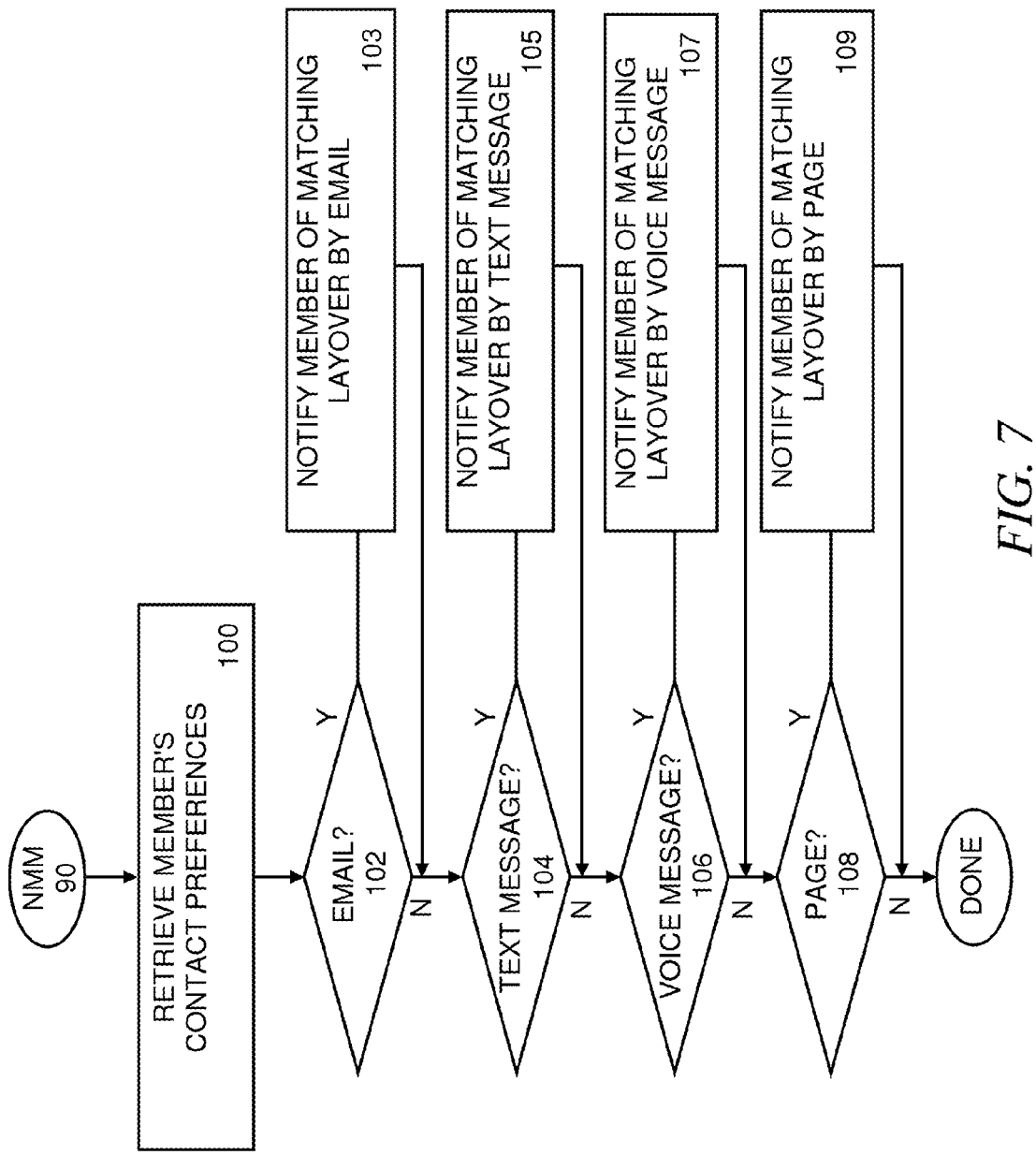
FIG. 7 illustrates a flow chart of all embodiments.

Referring to FIG. 7, a flow chart 90 of a notification method for all embodiments will be described. In this exemplary method of notifying a member of a matching overlay, the member's profile is consulted 100 to determine how the member is to be notified. It is assumed that the member has previously administered their profile with specifics regarding the method of notification as for example; see the discussion of FIG. 16. In this example, the data in the member's profile indicate whether the member desires email notification 102, text message notification 104, voice message notification 106 or a page notification 108. If the member desires email notification 102, the member is notified by an email message 103 sent from the social network 20/20A, through the Internet to the member's personal computer 17. If the member desires text message notification 104, the member is notified by a text message sent 105 from the social network 20/20A, optionally through the Internet and through the cellular network 50 to the member's cell phone 13. If the member desires voice message notification 106, the member is notified by a voice message sent 107 from the social network 20/20A, optionally through the Internet and through the cellular network 50 or plain old telephone network (not shown) to the member's phone or cell phone 13. In some embodiments, the voice message is pre-recorded while in other embodiments, the text message is created using text-to-speech or other methods known in the industry. If the member desires a page notification 108, the member is notified by a page sent 109 from the social network 20/20A, optionally through the Internet and through the paging network 55 to the member's pager 15.

Referring to FIG. 8, a typical member data record 101 of all embodiments will be described. Many possible data structures or databases are possible and known within the industry, all of which are included in the present invention. The member data record 101 is not limited to the fields shown. For example, in some embodiments, other fields are included such as work history so that a member will be able to search for other members who previously worked for the same company (e.g., the Air Force). The example shown in FIG. 8 includes a user id to assist in uniquely identifying the user, a member name, a home phone number, work phone number, cell phone number, email address, home address, buddy list and preferred contact methods (e.g., by text message . . . ). The buddy list is a list of other members that this member considers a "buddy" or friend, trusted in some way, etc.

Figure 9:
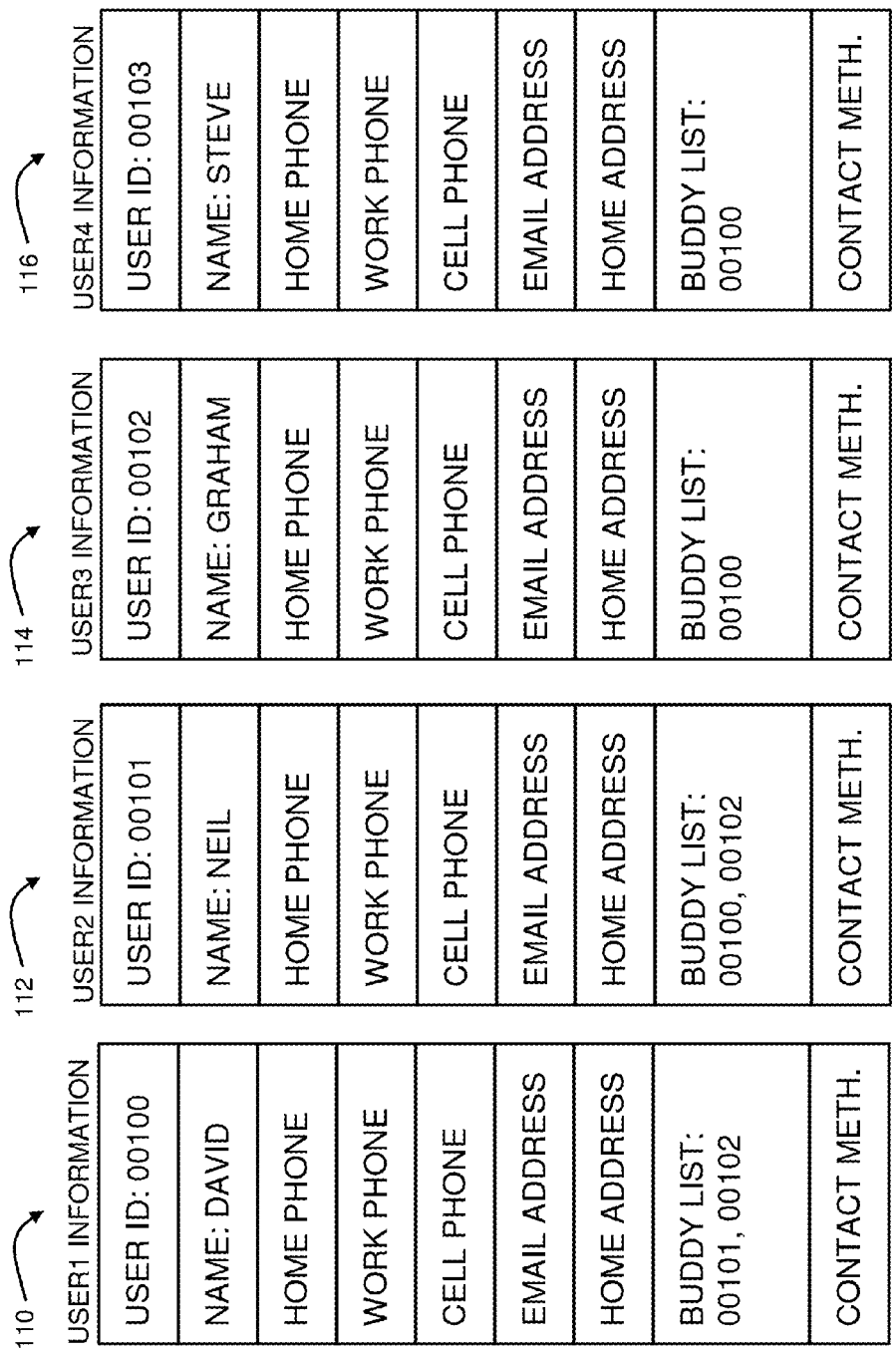
FIG. 9 illustrates a relationship example of several member data record of all embodiments.

Referring to FIGS. 8 and 9, a relationship example of several member data record of all embodiments will be described. In this very simple example, only four members are shown although in practice, hundreds or thousands of members are expected. Each member 110/112/114/116 has a user id (00100, 00101, 00102 and 00103 in this example), a name, phone numbers, email address, home address, contact method(s), a buddy list, and optionally, a list of associations. The optional associations list is a list of associations between each member and one or more schedule systems 20. For example, this list contains records or entries (unique person identifier) and each record includes an identifier of the schedule system 20 (e.g. United Airlines) and an identifier of the member (person identifier) within that schedule system 20 (e.g. badge number 123456), etc.

Figure 10:
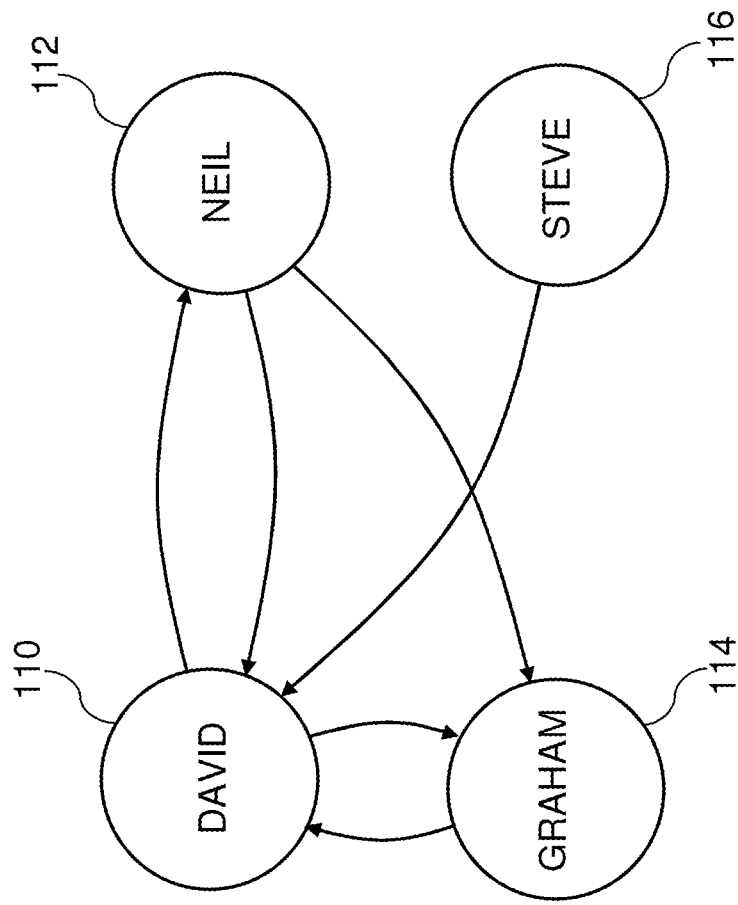
FIG. 10 illustrates a directed graph depicting the relationship between the several member data record in the example of FIG. 9 of all embodiments.

For simplicity and program operation, the buddy list consists of a list of user ids of other members who are buddies with each other. For example, David's user information includes member 00101 and member 00102 in the buddy list, so Neil and Graham are buddies of David. Likewise, Neil includes user id 00100 in his buddy list and, therefore, David is a buddy of Neil and Neil is a buddy of David. These relationships are depicted in FIG. 10. David 110 is a buddy to everyone depicted by inwardly directed arrows (his user id is included in Neil's, Graham's and Steve's buddy list). Neil is a buddy of David. Graham is a buddy of David. Neil and Steve is not a buddy to each other. As will be shown in FIGS. 13 and 14, in the preferred embodiment, notification of an overlapping layover will be sent when a two-way relationship exists such as with David and Neil or with David and Graham. In such embodiments, no notification is provided when that two-way relationship is absent such as when an overlapping layover occurs between Neil and Steve.

In some embodiments, mechanisms are provided to make sure only one notification is sent to each member for a specific layover. For example, a match for David-Graham is a duplicate of a match for Graham-David. One method to prevent duplicate notifications is to save a record of the notification in a table/database and before sending a notification, consult that table/database to see if it was previously sent. For example, when David's notification is sent, the layover match will be recorded as 00100.00102.LAX.20070901 (low member user ID first) so that when the methods find Graham's buddy list and finds David as a match, it will not send another notification because the second match will also be tagged as 00100.00102.LAX.20070901 (low member user ID first).

Figure 10A:
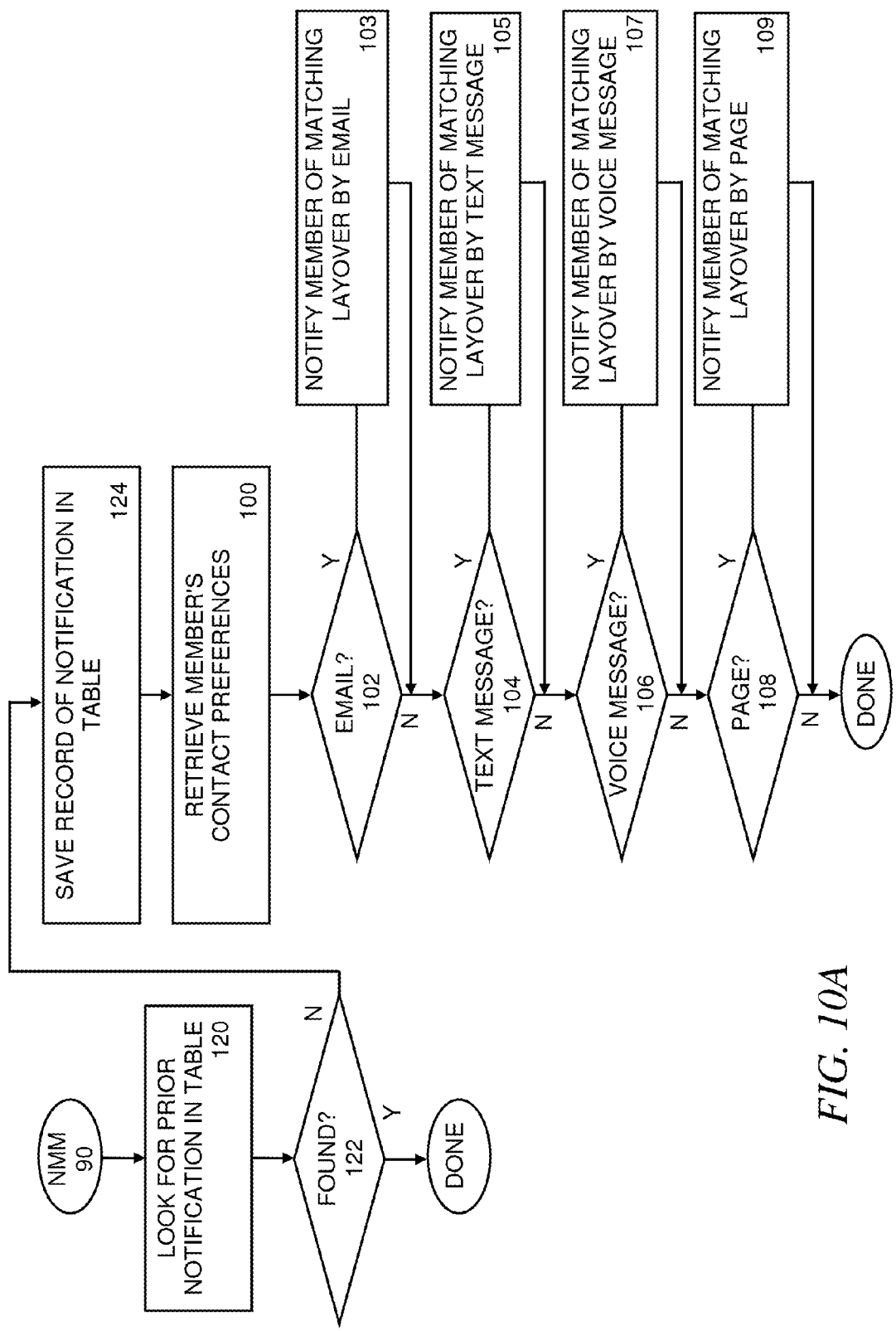
FIG. 10A illustrates a flow chart for preventing duplicate notifications of all embodiments.

Referring to FIG. 10A, an exemplary method of preventing duplicate notifications will be described. A table of prior notifications is searched 120 to determine if the current notification has already been found and sent. If the current notification is found in the table 122, nothing is done since the notification was previously sent. If it is not found 122, a record of the current notification is stored in the table 124 to prevent duplicate transmissions of the same notice. Now the method continues as in FIG. 7. The member's profile is consulted 100 to determine how the member is to be notified. It is assumed that the member has previously administered their profile with specifics regarding the method of notification as for example; see the discussion of FIG. 16. In this example, the data in the member's profile indicate whether the member desires email notification 102, text message notification 104, voice message notification 106 or a page notification 108. If the member desires email notification 102, the member is notified by an email message 103 sent from the social network 20/20A, through the Internet to the member's personal computer 17. If the member desires text message notification 104, the member is notified by a text message sent 105 from the social network 20/20A, optionally through the Internet and through the cellular network 50 to the member's cell phone 13. If the member desires voice message notification 106, the member is notified by a voice message sent 107 from the social network 20/20A, optionally through the Internet and through the cellular network 50 or plain old telephone network (not shown) to the member's phone or cell phone 13. In some embodiments, the voice message is pre-recorded while in other embodiments, the text message is created using text-to-speech or other methods known in the industry. If the member desires a page notification 108, the member is notified by a page sent 109 from the social network 20/20A, optionally through the Internet and through the paging network 55 to the member's pager 15.

In some embodiments, methods are provided to allow a member to blackout certain dates or date ranges so other members are not notified of overlapping layovers. For example, if David already has plans during his layover in Atlanta on July $2^{nd}$, David would create a blackout date for July $2^{nd}$ and the present invention would suppress sending a notification to either David or Graham regarding the July 2 layover. Alternately, the system would send a notification to David but not to Graham unless Graham also had a blackout set for July $2^{nd}$.

Because it is anticipated that repetitive records are downloaded from the schedule systems 20 to the social network 30, it is anticipated that in some embodiments, mechanisms are provided so that each notification will be made once (e.g. there is memory of prior notifications or prior schedule downloads) and that if a layover changes (e.g. a flight of a member is changed or canceled) then a new notification is made informing related members of the change.

Figure 11:
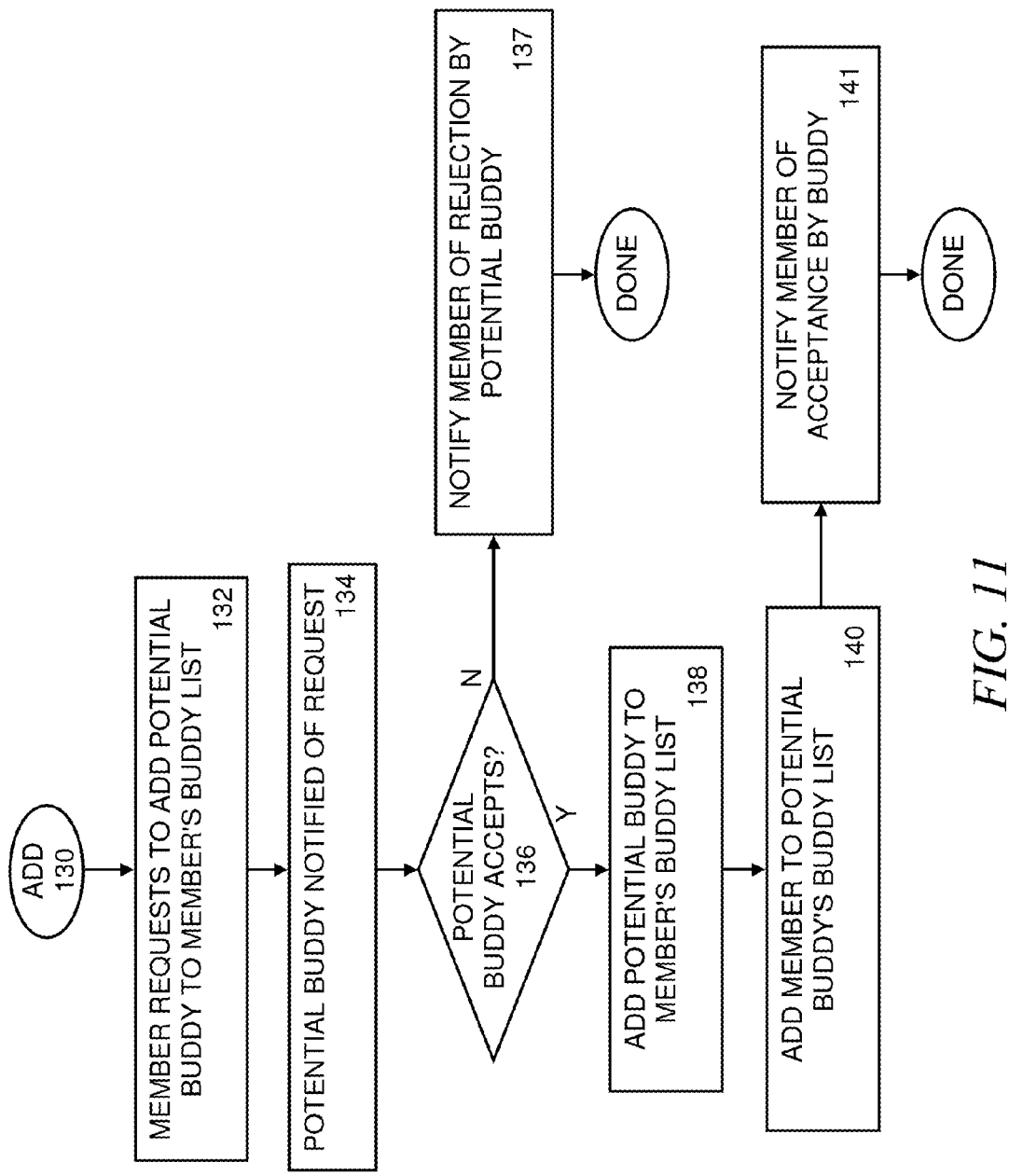
FIG. 11 illustrates a flow chart for adding a member to a buddy list of all embodiments.

Referring to FIG. 11, a flow chart for adding a member to a buddy list of all embodiments will be described. For example, in the example of FIGS. 9 and 10, Steve is not on any other member's buddy list. In this exemplary method 130, the member (e.g., Steve) requests another member be added to his buddy list 132. The potential buddy (e.g., David) is notified that another member (e.g., Steve) wishes to become a member of their buddy list 134. This notification is normally sent by email, but in other embodiments, sent by page, text message, voice, etc. If the potential buddy (e.g., David) does not accept 136, to invitation remains open until the potential buddy either accepts or rejects at a later date. If the potential buddy outright rejects the request, the member (e.g., Steve) is notified of the rejection 137 by email or other known methods. If the potential buddy (e.g., David) accepts, the potential buddy (e.g., David) is added to the member's (e.g., Steve) buddy list 138 and the member (e.g., Steve) is added to the potential buddy's (e.g., David) buddy list as well 140 and the member (e.g., Steve) is notified of the acceptance 141 by email or other known methods.

Figure 12:
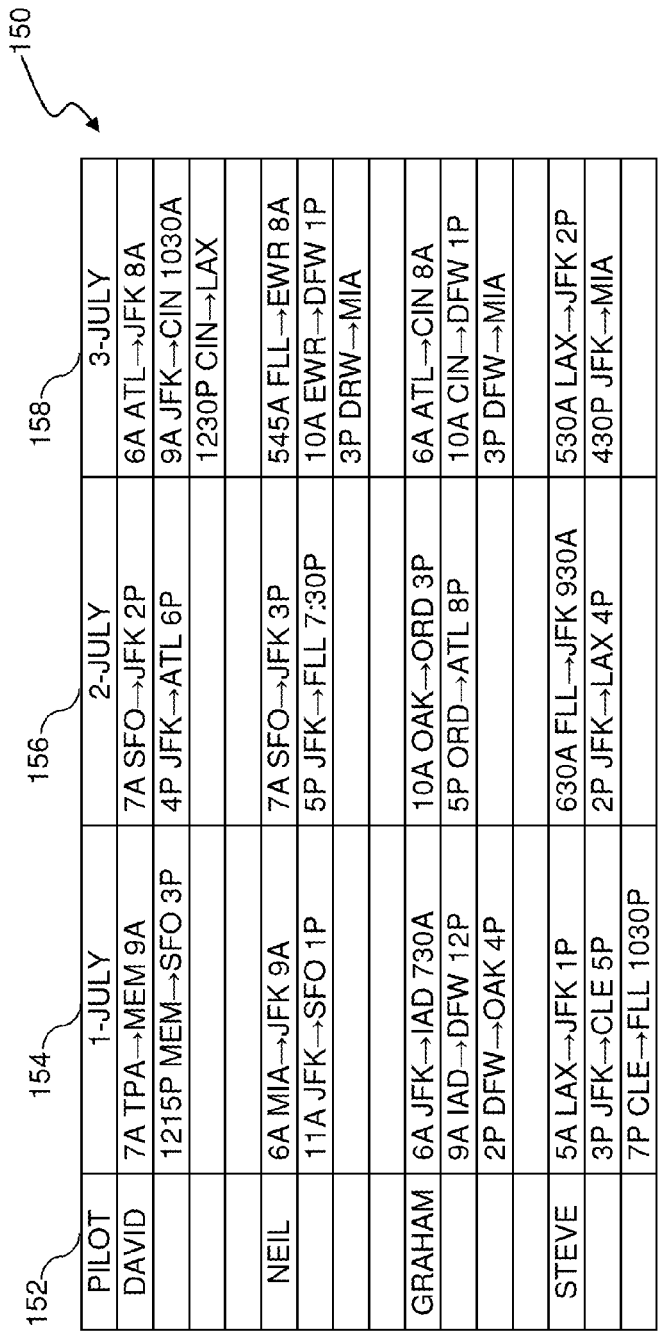
FIG. 12 illustrates a table showing an exemplary schedule of all embodiments.

Referring to FIG. 12, a table showing an exemplary schedule 150 of all embodiments will be described. In this simplified example, for airline personnel 152 (David, Neil, Graham and Steve) are scheduled to fly on July $1^{st}$, July $2^{nd}$ and July $3^{rd}$ 154/156/158. For example, David flies from Tampa (TPA) at 7:00 AM on July $1^{st}$ to Memphis (MEM), arriving at 9:00 AM the same day, and then flies from Memphis (MEM) at 12:15 PM on July $1^{st}$ to San Francisco (SFO), arriving at 3:00 PM. Since no other flights are scheduled for David on July $1^{st}$, David has a layover in San Francisco on July $1^{st}$.

Figure 13:
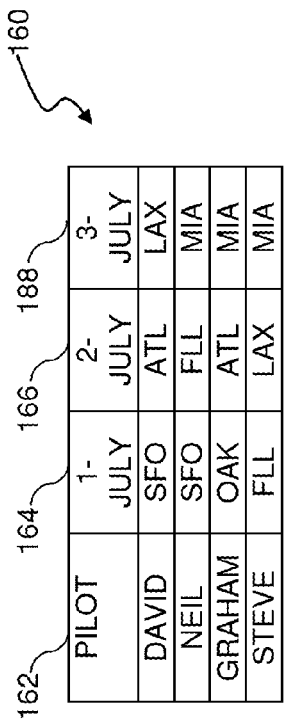
FIG. 13 illustrates a table showing layovers of the exemplary schedule from FIG. 12 of all embodiments.

FIG. 13 shows a table of layovers of the exemplary schedule from FIG. 12. David and Neil have a layover in San Francisco on July $1^{st}$, David and Graham in Atlanta (ATL) on July $2^{nd}$ and Neil, Graham and Steve have a layover in Miami (MIA) on July $3^{rd}$. Prior to the present invention, it would be difficult for these people to discover that they were going to be staying overnight in the same geographic location (e.g., San Francisco Bay area) and could, perhaps, plan a social event such as dinner, etc. With the present invention, as soon as the master schedule 22 (or when a scan of the master schedule is performed, e.g., 3:00 AM), notifications are sent to members that have overlapping layovers with buddy members. Using the social network 20/20A database 34 examples from FIGS. 9 and 10, David and Neil would receive notification of their overlapping layover in San Francisco on July $1^{st}$, David and Graham would receive notice of their overlapping layover in Atlanta on July $2^{nd}$ but neither Neil, Graham nor Steve would receive notification because they don't have reciprocal buddy agreements (e.g., Steve is not on Neil's buddy list, Neil is not on Graham's buddy list and Steve is not on Graham's buddy list.

Figure 14:
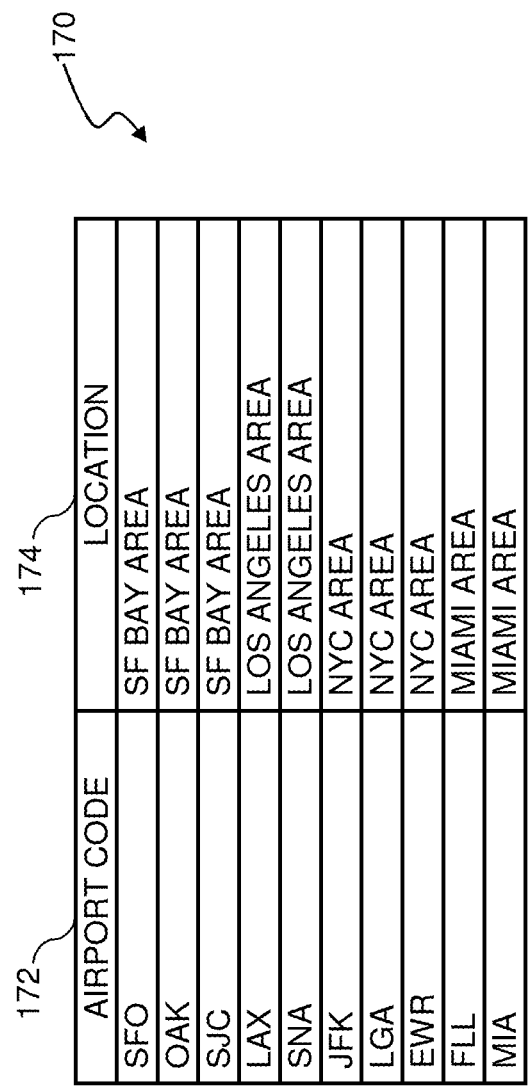
FIG. 14 illustrates a table showing an exemplary location thesaurus of all embodiments.

Referring to FIG. 14, a table showing an exemplary location thesaurus 170 of all embodiments will be described. Because scheduling systems are often fine-grained, a generalization thesaurus 170 such as shown in FIG. 14 is often needed. In such a generalization thesaurus 170, multiple fine-grained locations/destinations 172 are mapped to more general locations 174. As in the example shown, three airports (SFO, OAK and SJC) map to the San Francisco Bay area since they are all within a taxi, train or bus ride (commute) to each other.

Figure 15:
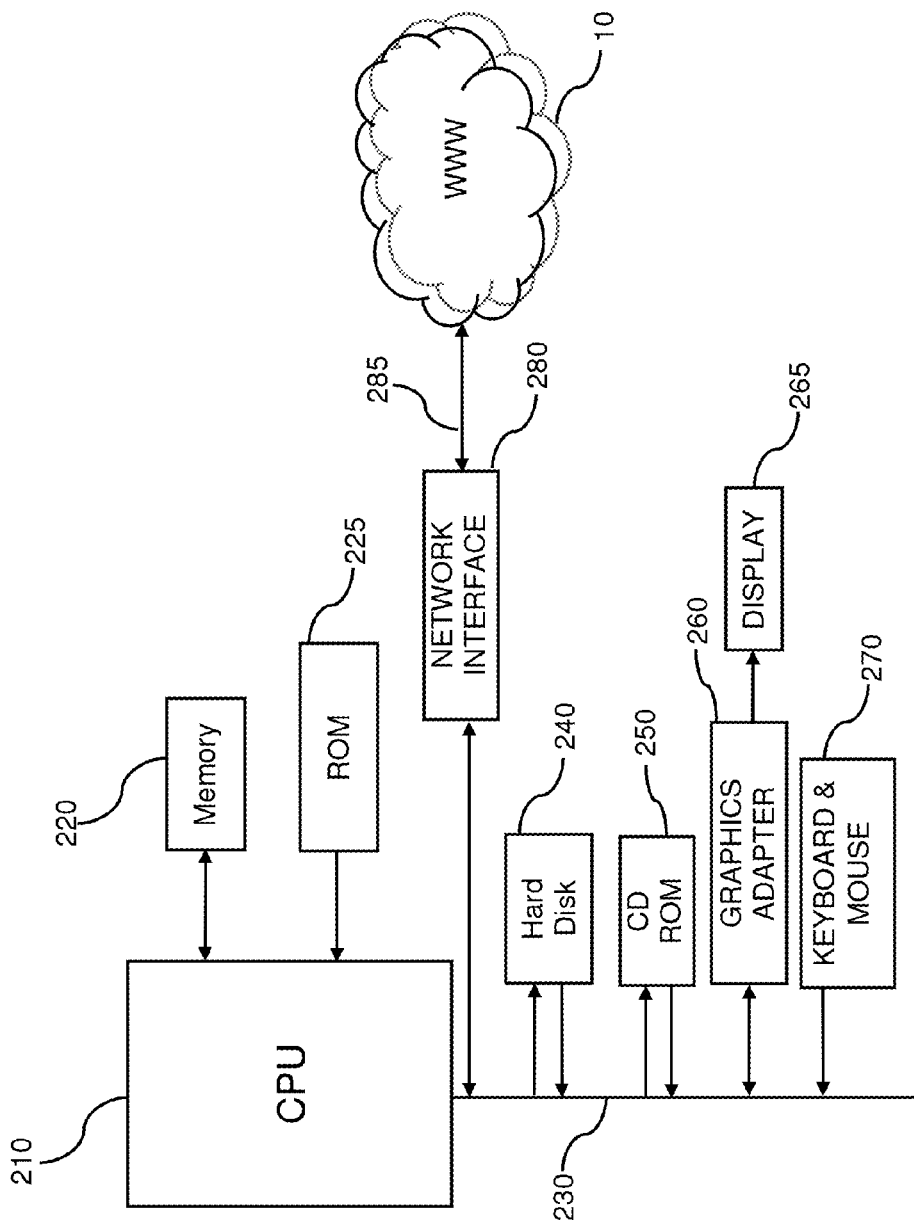
FIG. 15 illustrates a schematic diagram of a computer system of all embodiments.

Referring to FIG. 15, a schematic diagram of a computer system of all embodiments will be described. Although shown in its simplest form, having a single processor, many different computer architectures are known that accomplish similar results in a similar fashion and the present invention is not limited in any way to any particular computer system. The present invention works well utilizing a single processor system as shown in FIG. 15, a multiple processor system where multiple processors share resources such as memory and storage, a multiple server system where several independent servers operate in parallel (perhaps having shared access to the data or any combination. In this, a processor 210 is provided to execute stored programs that are generally stored for execution within a memory 220. The processor 210 can be any processor or a group of processors, for example an Intel Pentium-4® CPU or the like. The memory 220 is connected to the processor and can be any memory suitable for connection with the selected processor 210, such as SRAM, DRAM, SDRAM, RDRAM, DDR, DDR-2, etc. Firmware is stored in firmware storage 225 that is connected to the processor 210 and may include initialization software known as BIOS. This initialization software usually operates when power is applied to the system or when the system is reset. In some embodiments, the software is read and executed directly from the firmware storage 225. Alternately, the initialization software is copied into the memory 220 and executed from the memory 220 to improve performance.

Also connected to the processor 210 is a system bus 230 for connecting to peripheral subsystems such as a network interface 280, a hard disk 240, a CDROM 250, a graphics adapter 260 and a keyboard/mouse 270. The graphics adapter 260 receives commands and display information from the system bus 230 and generates a display image that is displayed on the display 265.

In general, the hard disk 240 may be used to store programs, executable code and data persistently, while the CDROM 250 may be used to load said programs, executable code and data from removable media onto the hard disk 240. These peripherals are meant to be examples of input/output devices, persistent storage and removable media storage.

Other examples of persistent storage include core memory, FRAM, flash memory, etc. Other examples of removable media storage include CDRW, DVD, DVD writeable, compact flash, other removable flash media, floppy disk, ZIP®, etc. In some embodiments, other devices are connected to the system through the system bus 230 or with other input-output connections. Examples of these devices include printers; graphics tablets; joysticks; and communications adapters such as modems and Ethernet adapters.

The network interface 280 connects the computer-based system to the world-wide-web 10 through a link 285 which is, preferably, a high speed link such as a cable broadband connection, a Digital Subscriber Loop (DSL) broadband connection, a T1 line or a T3 line.

Figure 16:
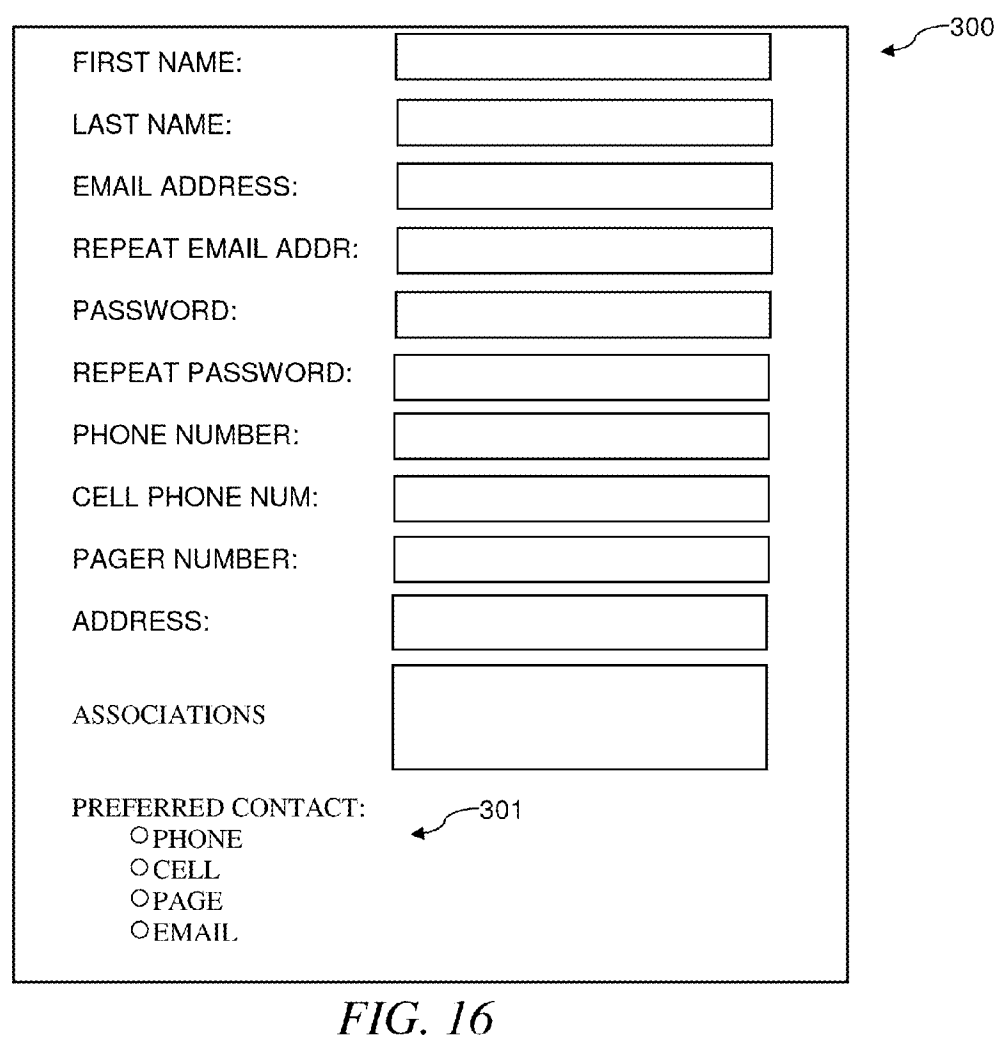

Referring to FIG. 16, a typical user interface 300 for creating a member account of all embodiments will be described. In this typical user interface 300, the new member enters their name (first and last), email address, confirmation of email address, password, confirmation of password, phone number, cell phone number, pager number and address. The same or similar user interface is presented when the member needs to change/update any of their personal information. In social network systems 30 in which an association mechanism is provided, the member adds as many associations as needed within the associations interface (e.g. United Airlines: 123456, Expedia: tina@yahoo,com, etc). The bottom of the user interface has four radio buttons 301 (circles that darken when selected) for the preferred method of contact (phone, cell, pager or email). The member selects one or more of these radio buttons 301, thereby a darkened circle indicates the member will receive notifications of overlapping layovers by the means associated with the darkened button. To restore the radio button 301 to its original non-selected state, it is selected again. Many user interface paradigms are known in the industry for obtaining user information and the example shown is just one possible user interface. All known user interfaces for obtaining user data and preferences are included in the present invention.

Figure 17:
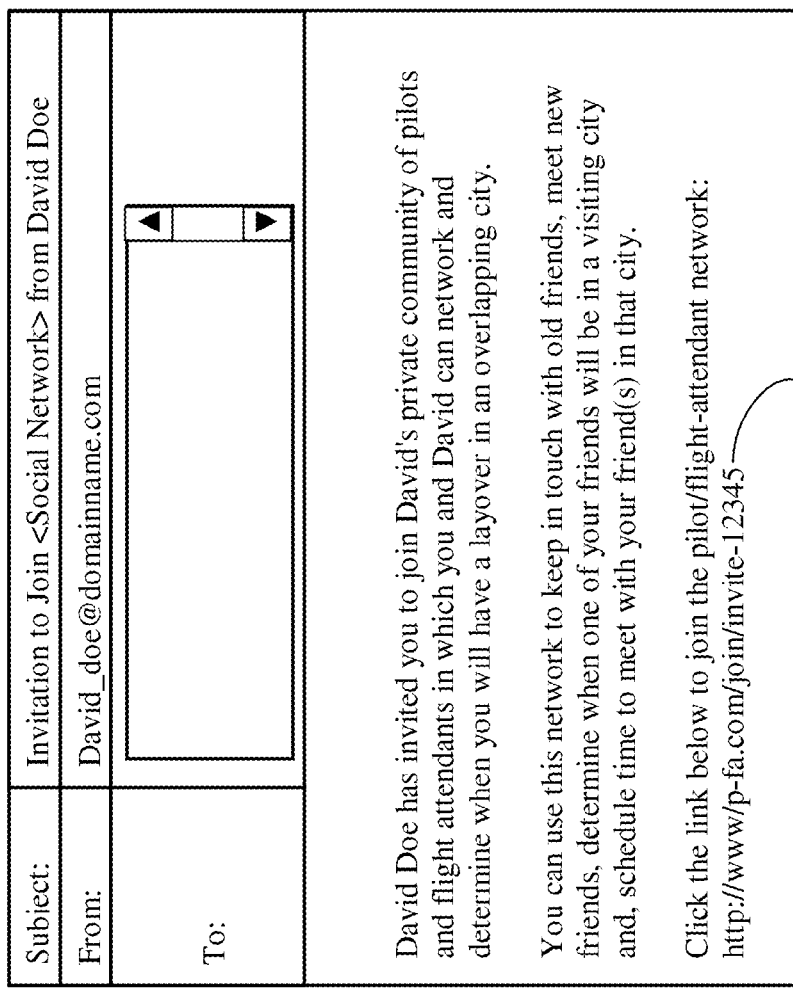
FIG. 17 illustrates a typical user interface for inviting a member to be a buddy (friend) of all embodiments.

Referring to FIG. 17, a typical user interface 310 for inviting a member to be a buddy (friend) of all embodiments will be described. In this sample email message from David, the recipient is invited to join the social network and become a member of David's buddy list. To do such, the recipient directs their browser to the cited web site 312, where they are presented with welcome user interface screens and registration user interfaces such as in FIG. 16.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A computer system providing a social network for traveling people, the computer system comprising:
   a server computer;
   software executing on the server computer maintains a list of members and, for each member in the list of members, the software maintains a list of buddies of the each member, the buddies also being in the list of members, each member having at least one association to a unique person identifier;
   the software downloads at least one schedule from one or more pre-determined schedule systems, each of the at least one schedule created by the one or more schedule systems without direct input from the each member, each schedule comprising a plurality of records, each of the records comprising a person identifier, at least one date/time, and at least one location, the person identifier uniquely identifies a person associated with the each record;
   the software searches each of the at least one schedule for a subset of the records in which the person identifier corresponds with the unique person identifier of any member of the list of members and the software creates layover entries from the subset of the records, each of the layover entries comprise the member, a layover location, and a layover date/time;
   the software searches the layover entries for overlapping layovers, the overlapping layover determined by a first member of the list of members having a layover that overlaps with a layover of a buddy of the first member; and
   for each overlapping layover, the software notifies a person selected from the group consisting of the first member and the buddy who have the overlapping layover.

2. The computer system of claim 1, wherein after the software notifies, the software saves the each overlapping layovers in a database, and the software consults the database prior to any notification and suppresses the notification if a prior notification was made for that overlapping layover.

3. The computer system of claim 1, wherein the at least one schedule is stored within the social network after downloading.

4. The computer system of claim 1, wherein the at least one schedule is stored external to the social network and the at least one schedule is downloaded to the social network.

5. The computer system of claim 1, wherein at least one of the one or more pre-determined schedule systems is a scheduling system for flight crews.

6. The computer system of claim 1, wherein at least one of the one or more pre-determined schedule systems is an online travel scheduling system.

7. The computer system of claim 1, wherein at least one of the one or more pre-determined schedule systems is a scheduling system for truck drivers.

8. The computer system of claim 1, wherein the social network software further implements a location thesaurus for mapping multiple geographic locations into a geographic area.

9. The computer system of claim 1, wherein the software notifies a person selected from the group consisting of the first member and the buddy who have the overlapping layover by sending a notification selected from the group consisting of an email, a text message, a voice message, and a page.

10. A method of notifying members of a social network of upcoming overlapping layovers comprising:
    (a) maintaining a list of members and, for each member, maintaining a list of buddies of the each member, each member having at least one association to at least one unique identifier;
    (b) downloading at least one schedule from at least one pre-determined schedule system, each of the at least one schedule created at a corresponding one of the at least one schedule systems without direct input from any member of the list of members, each record of the at least one schedule comprising a person identifier, a date, and a location, wherein the person identifiers uniquely identify one person;

(c) for each record, if the person identifier matches the unique identifier of a member, saving a layover data record including the member, the date, and the location; and (d) for each of the layover data records, searching the layover data records for a buddy having an overlapping layover data record, and if the searching finds an overlapping layover data record, automatically notifying the member of the overlapping layover.

11. The method of claim 10, wherein the overlapping layover is declared when the member and the buddy are within a same location for a period of time.

12. The method of claim 10, further comprising storing the schedule(s) within the social network after downloading.

13. The method of claim 10, wherein the searching the layover data records for the buddy having an overlapping layover data record includes looking up the location of the buddy and the location of the member in a location thesaurus to determine a layover overlap.

14. The method of claim 10, wherein the step of notifying the member includes sending one or more messages selected from the group consisting of sending an email, sending a text message, sending a voice message, and sending a page.

15. Program instructions tangibly embodied in a non-transitory storage medium for notifying of upcoming overlapping layovers, wherein the at least one instruction comprises:

(a) computer readable instructions maintain a list of members and, for each member, maintain a list of buddies of the each member, each member having at least one association to at least one unique identifier;

(b) computer readable instructions download at least one schedule, each of the at least one schedule created on a pre-determined schedule system without direct input from any member in the list of members, each of the at least one schedules comprising a plurality of records, each of the records comprising a person identifier, at least one date, and at least one location;

(c) computer readable instructions extract layover data from the records in which the person identifier in the record corresponds with the unique identifier of any member of the list of members, the layover data comprises the any member, a layover location, and a layover time period, wherein the person identifier assists in uniquely identifying a correspondence between the records in the schedules and the any member of the list of members;

(d) computer readable instructions search the layover data for a set of overlapping layovers in which a layover of the member and a layover of a buddy of the member have the same location;

(e) for each overlapping layover in the set of overlapping layovers, computer readable instructions notify the member and/or the buddy of the overlapping layover;

(f) periodically repeating steps (b) and (e).

16. The program instructions tangibly embodied in the non-transitory storage medium of claim 15, wherein the computer readable instructions that search the layover data for a set of overlapping layovers search a thesaurus to map surrounding locations to the same location.

17. The program instructions tangibly embodied in the non-transitory storage medium of claim 15, wherein the schedule includes scheduling information for pilots.

18. The program instructions tangibly embodied in the non-transitory storage medium of claim 15, wherein the schedule includes scheduling information for flight attendants.

19. The program instructions tangibly embodied in the non-transitory storage medium of claim 15, wherein the schedule includes scheduling information from an online travel reservation system.

20. The program instructions tangibly embodied in the non-transitory storage medium of claim 15, wherein the computer readable instructions that notify the member and/or the buddy of the overlapping layover include computer readable instructions for sending one or more messages selected from the group consisting of sending an email, sending a text message, sending a voice message, and sending a page.

* * * * *